(12) United States Patent
Tomassen

(10) Patent No.: US 9,611,005 B2
(45) Date of Patent: Apr. 4, 2017

(54) SLED MODULE

(71) Applicant: David Tomassen, Bellingham, WA (US)

(72) Inventor: David Tomassen, Bellingham, WA (US)

( * ) Notice: Subject to any disclaimer, the term of this patent is extended or adjusted under 35 U.S.C. 154(b) by 0 days.

(21) Appl. No.: 14/135,444

(22) Filed: Dec. 19, 2013

(65) Prior Publication Data

US 2015/0174975 A1 Jun. 25, 2015

(51) Int. Cl.
| | |
|---|---|
| *B60R 9/12* | (2006.01) |
| *B62M 27/00* | (2006.01) |
| *B62M 27/02* | (2006.01) |
| *B62J 7/00* | (2006.01) |

(52) U.S. Cl.
CPC ............ *B62M 27/00* (2013.01); *B62M 27/02* (2013.01); *B60R 9/12* (2013.01); *B62J 7/00* (2013.01); *B62M 2027/028* (2013.01); *Y10S 224/9175* (2013.01)

(58) Field of Classification Search
CPC . Y10S 224/9175; Y10S 224/917; B60R 9/12; B60D 1/173
USPC ..... 224/408, 450, 557, 546, 553, 917.5, 545
See application file for complete search history.

(56) References Cited

U.S. PATENT DOCUMENTS

| | | | | |
|---|---|---|---|---|
| 3,294,247 A | * | 12/1966 | Norrington | ................ 211/64 |
| 3,687,344 A | | 8/1972 | Nixon | |
| 5,639,001 A | * | 6/1997 | Brady | ................ 224/449 |
| 5,706,990 A | * | 1/1998 | Lahrson | ................ 224/410 |
| 5,941,497 A | * | 8/1999 | Inoue | ............ H01Q 1/125 |
| | | | | 248/291.1 |
| 6,019,265 A | * | 2/2000 | Deloza | ................ 224/405 |
| 6,457,618 B1 | * | 10/2002 | Hancock et al. | ......... 224/401 |
| 6,749,036 B1 | | 6/2004 | Schrapp et al. | |
| 7,066,366 B2 | * | 6/2006 | Hancock et al. | ......... 224/401 |
| 2004/0108349 A1 | | 6/2004 | Child | |
| 2005/0183291 A1 | * | 8/2005 | Kiniry et al. | ............. 36/122 |
| 2008/0272165 A1 | | 11/2008 | McMillan | |
| 2010/0025443 A1 | * | 2/2010 | Racz et al. | ............. 224/545 |
| 2011/0290840 A1 | * | 12/2011 | Huang | ............. 224/539 |
| 2012/0000949 A1 | * | 1/2012 | Williams, Jr. | ....... B60R 7/14 |
| | | | | 224/401 |
| 2012/0280530 A1 | * | 11/2012 | Nemoto | ............ 296/37.12 |

FOREIGN PATENT DOCUMENTS

JP H0592767 4/1993

OTHER PUBLICATIONS

Cheetah Factory Racing 2010 Metal Snowboard Bracket Mounting Instructions.*

(Continued)

*Primary Examiner* — Justin Larson
*Assistant Examiner* — Scott McNurlen
(74) *Attorney, Agent, or Firm* — Jeffrey Parry Intellectual Property Law Group PLLC; Jeffrey C. Parry

(57) ABSTRACT

A sled module. The sled module includes a rack configured to attach to the tunnel of a snowmobile. The rack includes two opposing sides. The rack also includes a base on each of the two opposing sides and at least two spacing and support rods configured to attach to the opposing sides to one another. The sled module also includes a bracket configured to receive an external device.

20 Claims, 22 Drawing Sheets

(56) References Cited

OTHER PUBLICATIONS

Vortech Manufacturing Website (Accessed via Wayback Machine—Jan. 16, 2012).*
Back Country Adventure Gear Website (Accessed via Wayback Machine—Apr. 22, 2012).*
X-Rack Website Pictures (Copyrighted 2003).*
http://www.snowestonline.com/forum/showthread.php?t=89772.
http://www.ebay.com/itm/SKINZ-UNIVERSAL-SNOWMOBILE-POLY-TUNNEL-RACK-CARRIER-/370772955576.
http://www.ebay.com/itm/SKINZ-UNIVERSAL-SNOWMOBILE-TUNNEL-RACK-CARRIER-CARGO-/230415474125.
http://www.ebay.com/itm/Snowmobile-Gas-Can-Rack-Adjustable-/221206378777.
http://www.roguemotorsportz.com/i36222-Van-Amburg-Snowmobile-Cargo-Carrier.aspx.
http://cheetahfactoryracing.com/collections/all.
http://www.backcountryadventuregear.com/.
http://www.x-rack.com/index.php.
http://www.knightriderracks.com/racks/ski-doo-xp-08-11-2/.
http://www.porttackracks.com/collections/snowmobile-racks.

* cited by examiner

SLED MODULE

CROSS-REFERENCE TO RELATED APPLICATIONS

Not applicable.

BACKGROUND OF THE INVENTION

Snowmobiling is a sport that is increasing rapidly in popularity. It allows participants to explore regions that would be extremely difficult to reach in any manner other than by hiking or snowshoeing. In addition, snowmobiles are the only mode of transportation in some areas. I.e., in the winter roads are impassable and snowmobiles are the only mechanical means of obtaining supplies or contact with outside sources.

However, snowmobiles have remarkably small cargo areas. In particular, the rear area of the snowmobile (called a "tunnel") may be made of plastic or aluminum and either little or no cargo can be placed on the tunnel because the tunnel material is not intended to hold high amounts of weight. If cargo is placed on the tunnel it may cause the tunnel to deform, coming into contact with the moving treads which can cause damage to the snowmobile or make the machine in inoperable.

Some attempts have been made to make use of the tunnel by "stiffening" the tunnel, or attaching something to the tunnel that is of sufficient strength that it can allow cargo to be placed on the tunnel without causing deformation. However, this merely strengthens the tunnel but does not affirmatively create a cargo area. I.e., they create a "platform" that can be used to carry cargo but otherwise it is up to the user to secure the cargo.

In addition, tunnel stiffeners are difficult to install. E.g., installation involves drilling holes in both the stiffener and the tunnel in order to attach the stiffener. In addition, they may require attachments, such as rivets, that are permanent or extremely difficult to remove. Thus, users have the option of either having the tunnel stiffener or nothing without any ability to go back and forth and still no ability to carry cargo.

Accordingly, there is a need in the art for a sled module that can be attached to the tunnel of a snowmobile. In addition, there is a need for the sled module to be able to be installed easily. Further, there is a need in the art for the sled module to be removable by the user as desired. Moreover, there is a need in the art for the sled module to include cargo areas for a user's gear.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example includes a sled module. The sled module includes a rack configured to attach to the tunnel of a snowmobile. The rack includes two opposing sides. The rack also includes a base on each of the two opposing sides and at least two spacing and support rods configured to attach to the opposing sides to one another. The sled module also includes a bracket configured to receive an external device.

Another example includes a sled module. The sled module includes a rack configured to attach to the tunnel of a snowmobile. The rack includes two opposing sides. The rack also includes a base on each of the two opposing sides and at least two spacing and support rods/bars configured to attach to the opposing sides to one another. The rack further includes a grab bar attached to the two opposing sides configured to allow a user to lift at least a portion of the snowmobile using the grab bar. The rack additionally includes a first set of attachment holes, where each of the holes in the first set of attachment holes is configured to receive an external strap with a cross-section that is wider in one direction than in the parallel direction and a second set of attachment holes, where each of the holes in the second set of attachment holes is configured to receive a circular attachment. The sled module also includes a mounting gusset configured to mate with the base of the rack and including one or more holes. The sled module further includes a bracket. The bracket includes a first layer configured to attach to the rack and a second layer attached to the first layer.

Another example includes a sled module. The sled module includes a rack configured to attach to the tunnel of a snowmobile. The rack includes two opposing sides. The rack also includes a base on each of the two opposing sides and at least two spacing and support rods configured to attach to the opposing sides to one another. The rack further includes a grab bar attached to the two opposing sides configured to allow a user to lift at least a portion of the snowmobile using the grab bar. The rack additionally includes a first set of attachment holes, where each of the holes in the first set of attachment holes is configured to receive an external strap with a cross-section that is wider in one direction than in the parallel direction and a second set of attachment holes, where each of the holes in the second set of attachment holes is configured to receive a circular attachment. The rack moreover includes a first mounting zone and a second mounting zone each configured to allow an external device to be attached to the rack. The sled module also includes a mounting gusset configured to mate with the base of the rack and including one or more holes. The sled module further includes a bracket. The bracket includes a first layer configured to attach to the rack at the first mounting zone and a second layer attached to the first layer. The bracket also includes a strap attachment. The sled module additionally includes a strap. The strap includes a first section. The strap also includes a first ratchet on a first end of the first section and a second ratchet on a second end of the first section, where the second end is opposite the first end. The strap further includes at least two second sections, where the at least two second sections are configured to mate with the first and second ratchet.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
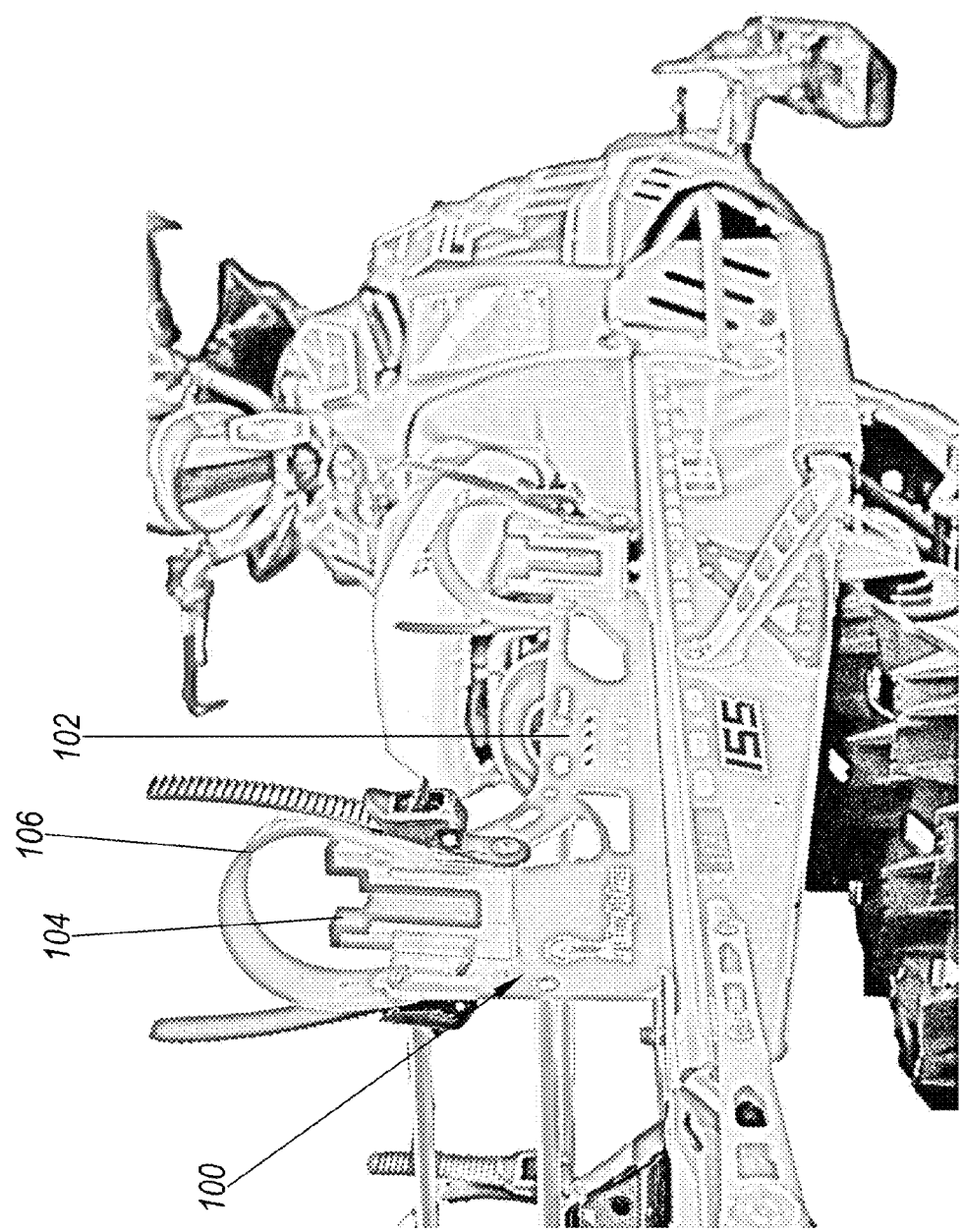
FIG. 1A illustrates an example of the sled module attached to a snowmobile.
Figure 1B:
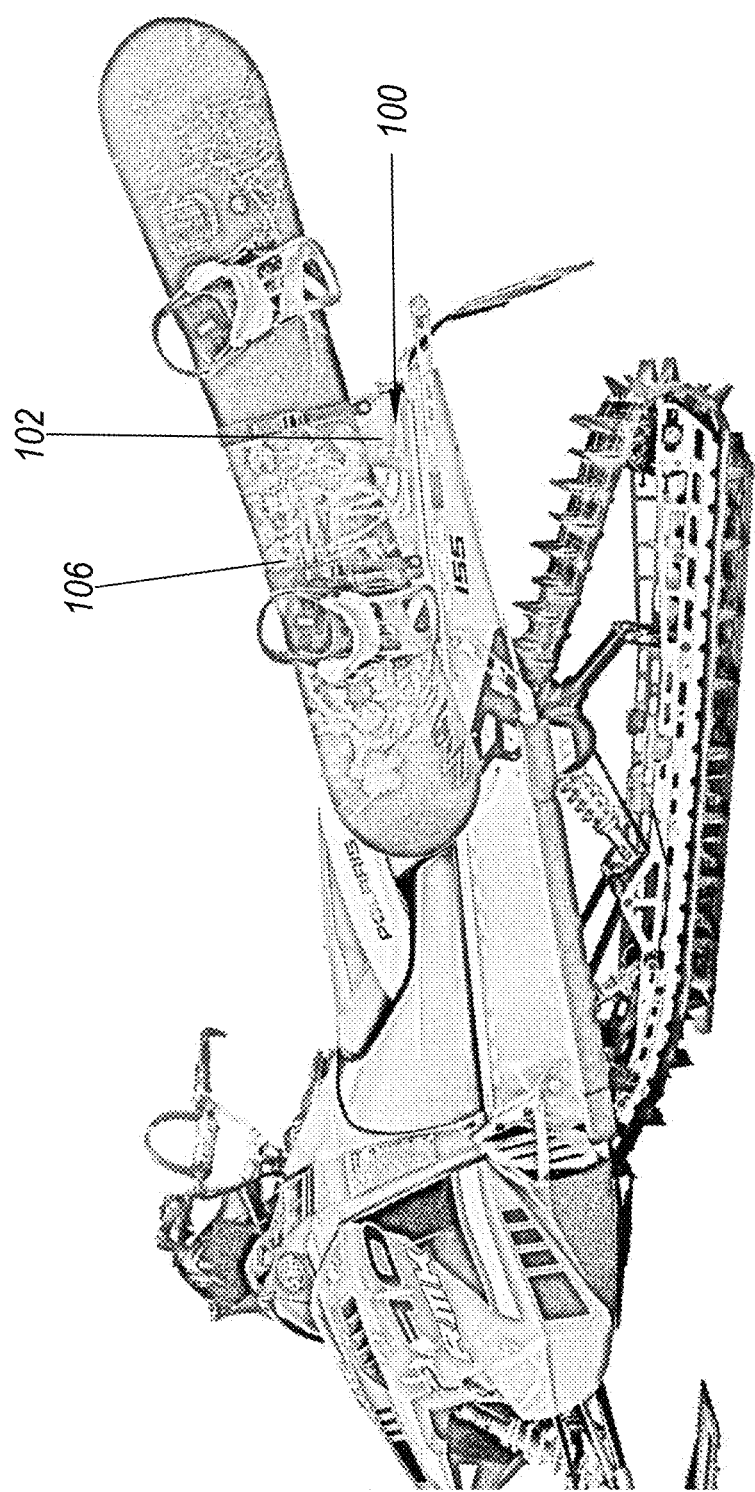
FIG. 1B illustrates the sled module with attached snowboard.

FIGS. 1A and 1B (collectively "FIG. 1") illustrate an example of a sled module 100. FIG. 1A illustrates an example of the sled module 100 attached to a snowmobile; and FIG. 1B illustrates the sled module with attached snowboard. The sled module 100 can be used to attach gear to a snowmobile. For example, the sled module 100 can be used to secure snowboards, skis, gas cans, clothing, shelter, such as tents, tools or any other desired gear. I.e., the user can secure and carry any desired gear with the sled module 100.

In particular, the sled module 100 can be configurable to allow the user to adjust the size and angle of the sled module and attached components. This allows the user to size "compartments" within the sled module 100. In addition, the sled module 100 can be adjusted in order to ensure that gear can be positioned in the most secure configuration. For example, the support rods (described in detail below) can be adjusted to different positions to ensure that gas cans, camera cases, or store supplies are supported in the front and back, regardless of size.

FIG. 1 shows that the sled module 100 can include a rack 102. The rack 102 can form the "body" of the sled module 100. In particular, the rack 102 can be attached to the tunnel of a snowmobile. This can both stiffen the tunnel to allow for storage or attachment and can allow other accessories to be mounted. I.e., other desired accessories can be attached to the rack 102 without being directly attached to the tunnel. This includes waterproof bags, gas can racks, and hard plastic cases to protect carrying supplies FIG. 1 also shows that the sled module can include a bracket 104. The bracket 104 can allow the user to carry a snowboard, skis or any other desired gear. In particular, the bracket 104 can be attached on the exterior of the rack 102, allowing gear that is too long to be placed on the rack 102 directly to still be secured to the snowmobile. Additionally or alternatively, the bracket 104 can be attached to any other suitable attachment point. I.e., and flat surface that can act as an attachment point for the bracket 104.

FIG. 1 further shows that the sled module 100 can include straps 106 to secure gear on the rack 102 or in the brackets 104. In particular, the straps 106 can provide a restraining force which secures gear to the sled module 100. This is true even if the force provided by the straps 106 is not in the same direction as the gear would move when unrestrained. E.g., if the gear would tend to move backward because of the motion of the snowmobile, the straps 106 can secure gear with a "downward" force.

Figure 2A:
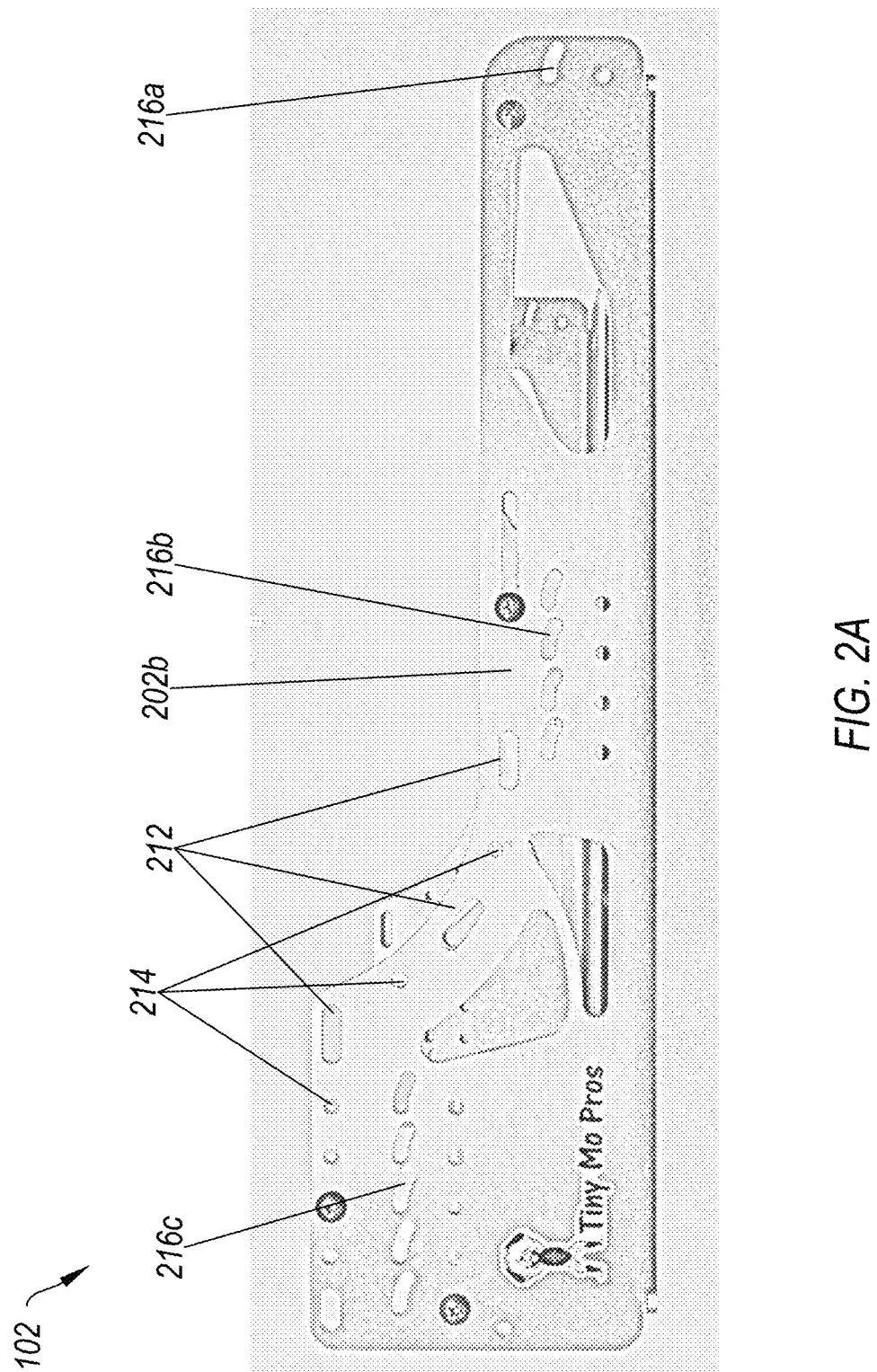
FIG. 2A illustrates a right side view of the rack, with the left side view being a mirror image thereof.
Figure 2B:
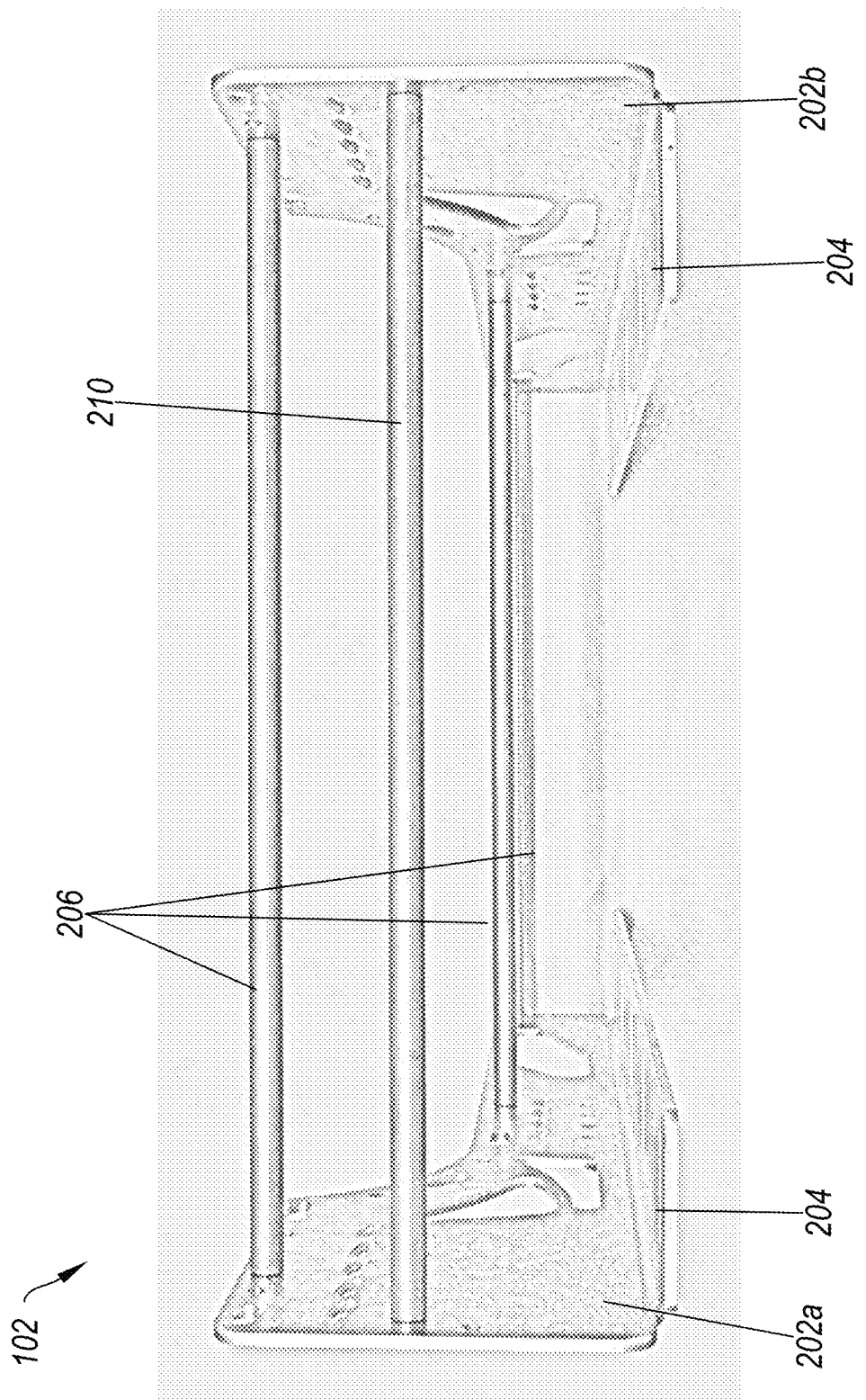
FIG. 2B illustrates a rear view of the rack.
Figure 2C:
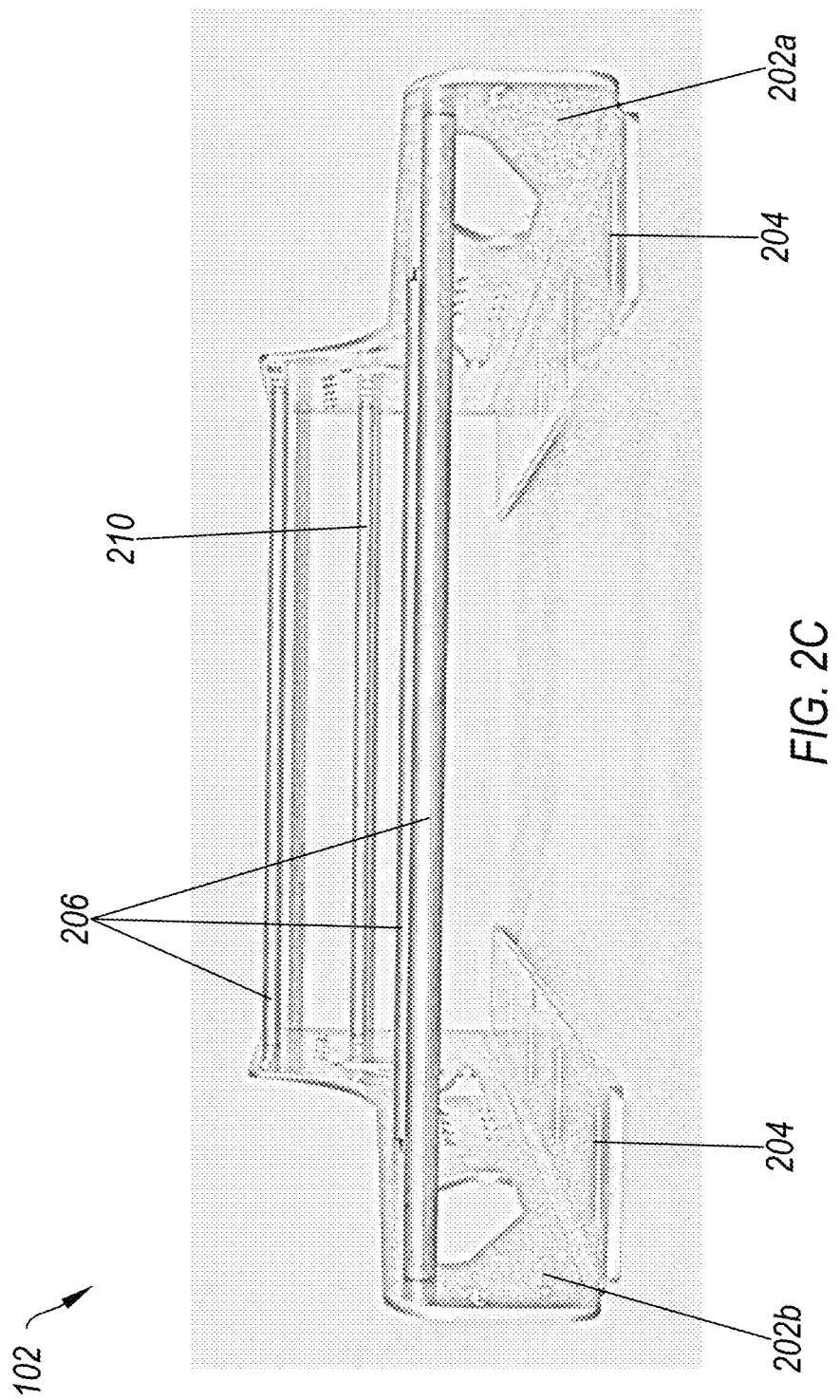
FIG. 2C illustrates a front view of the rack.
Figure 2D:
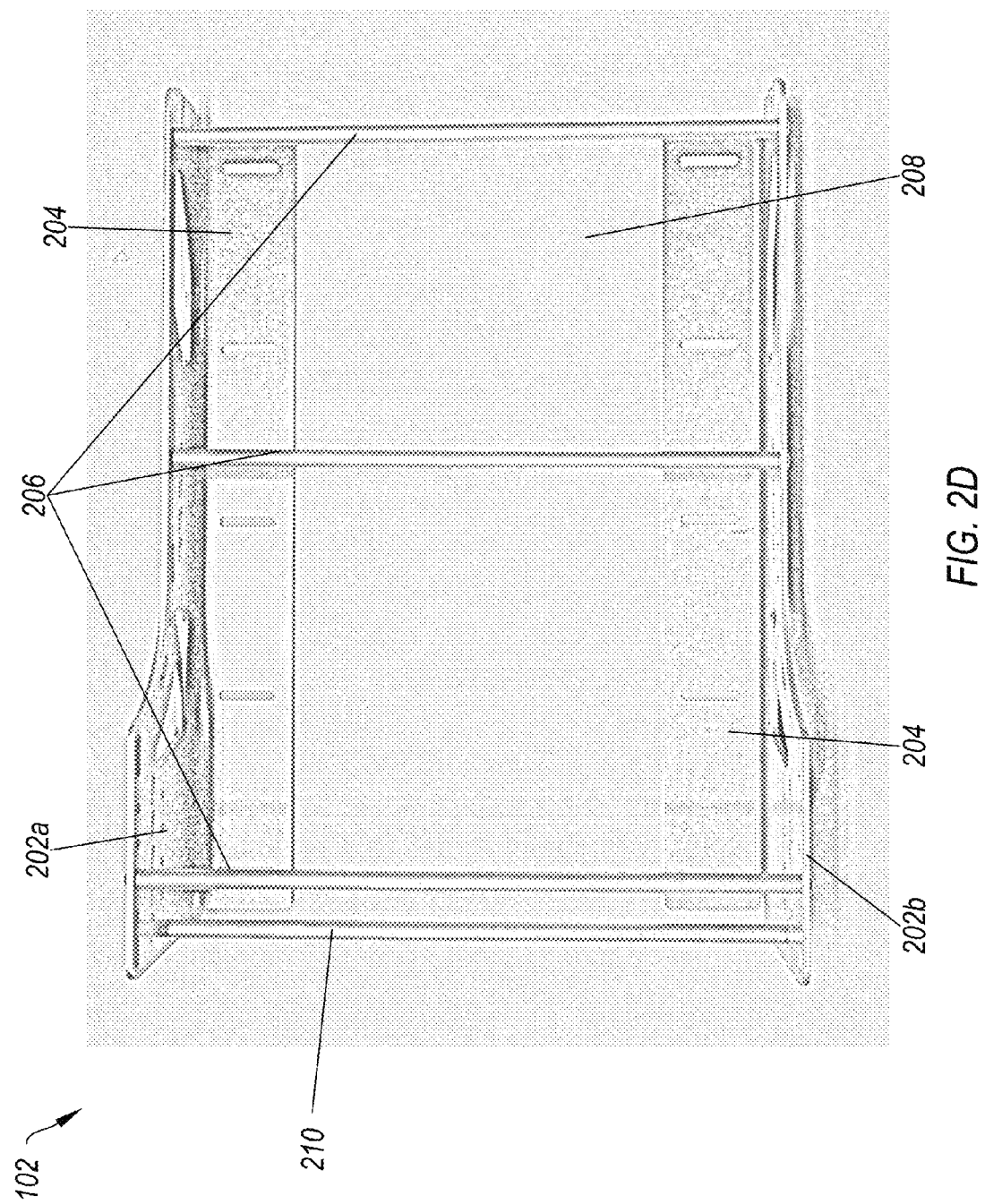
FIG. 2D illustrates a top view of the rack.
Figure 2E:
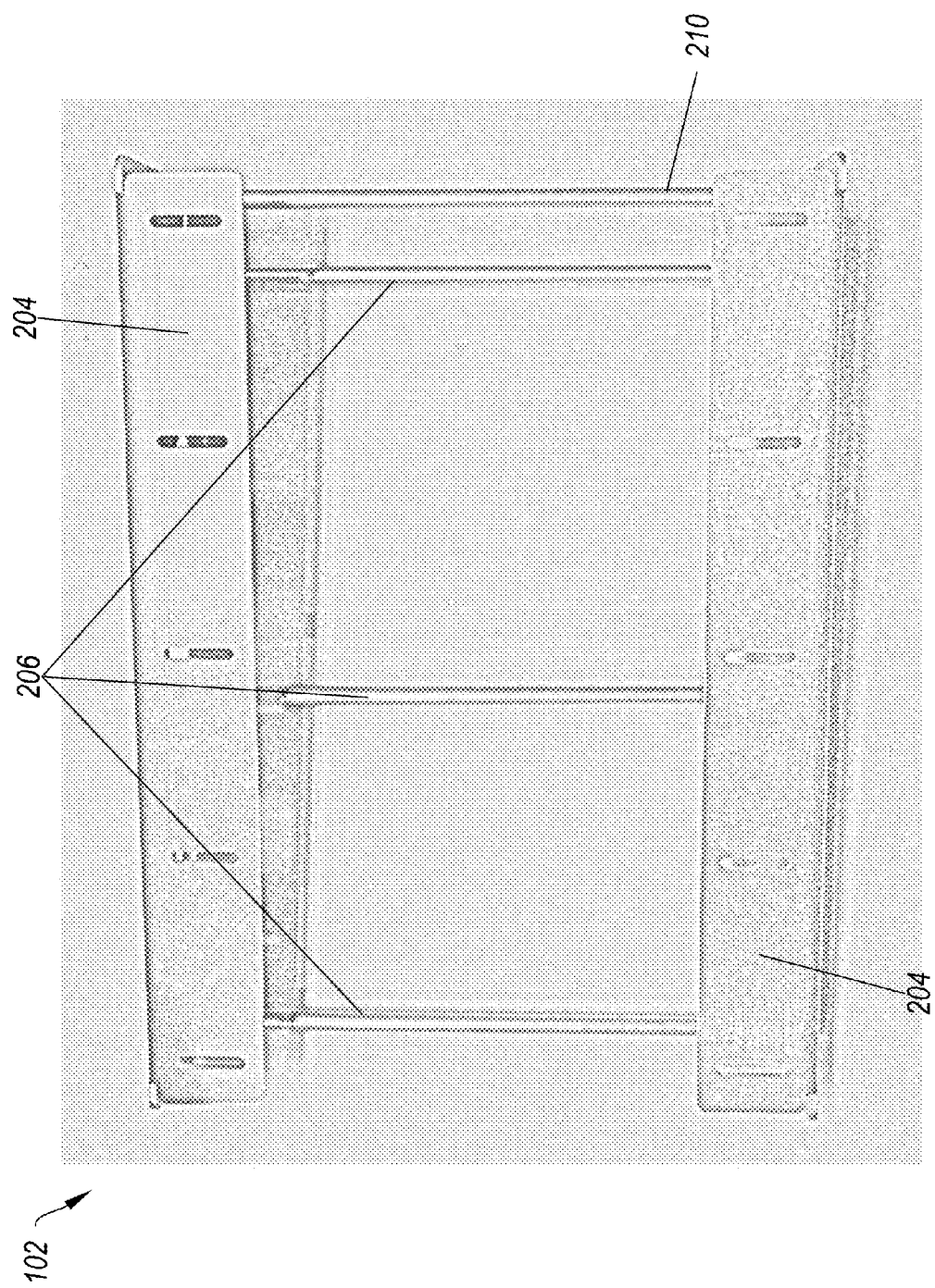
FIG. 2E illustrates a bottom view of the rack.

FIGS. 2A, 2B, 2C, 2D and 2E (collectively "FIG. 2") illustrate an example of a rack 102. FIG. 2A illustrates a right side view of the rack 102, with the left side view being a mirror image thereof; FIG. 2B illustrates a rear view of the rack 102; FIG. 2C illustrates a front view of the rack 102; FIG. 2D illustrates a top view of the rack 102; and FIG. 2E illustrates a bottom view of the rack 102. The rack 102 can be used to store gear over the tunnel (rear area above the treads) of a snowmobile. To do so, the rack 102 is configured to stiffen and support the tunnel for transporting added gear. In particular, the tunnel may be made of plastic or other pliable material. Thus, placing gear directly on the tunnel can cause the tunnel to deform, even to the point of coming in contact with the treads. Thus, the rack 102 can provide a stiff structure which prevents deformation. Additionally or alternatively, the rack 102 can strengthen the tunnel. I.e., the rack 102 can be attached to the strongest parts of the tunnel, preventing failure of the tunnel material. The rack 102 allows for integration into any sled platform because it features adjustability in different planes (as described below). As used in the specification and the claims, the phrase "configured to" denotes an actual state of configuration that fundamentally ties recited elements to the physical characteristics of the recited structure. As a result, the phrase "configured to" reaches well beyond merely describing functional language or intended use since the phrase actively recites an actual state of configuration.

FIG. 2 shows that the rack 102 can include a first side 202a and a second side 202b (collectively "sides 202"). The first side 202 and second side 202b can be mirror images of or similar to one another. I.e., when placed in opposing positions any portions of the sides 202, as described below, which are analogous to one another are directly opposite one another.

FIG. 2 moreover shows that the rack 102 can include a base 204 on each of the sides 202. The sides 202 can be perpendicular to the base 204. The base 204 can be used to attach the rack 102 to the tunnel of a snowmobile. In particular, the base 204 includes holes or slots that allow the sled module to be connected directly to the snowmobile tunnel or to other installation hardware. For example, bolts can pass through holes in the base 204, through the tunnel, and through holes in a mounting gusset (described below), securing the rack 102 to the tunnel.

FIG. 2 also shows that the rack 102 can include spacing and support rods 206. The spacing and support rods 206 ensure that the rack 102 remains stiff and that the configuration of the rack 102 remains constant. I.e., once the rack 102 is mounted, the spacing and support rods 206 ensure that the rack 102 remains in place and that the spacing between the sides 202 remains constant. Additionally or alternatively, the spacing and support rods 206 can be used to secure one or more items to the rack 102. I.e., the spacing and support rods 206 act as a location where a securing item, such as a hook on a bungee cord, a ratchet strap, or rope can be attached to secure gear.

FIG. 2 further shows that the spacing and support rods 206 can create a storage compartment 208. I.e., the spacing and support rods 206 can be placed at a desired location on the rack 102 to create a volume that can be used to store gear, as desired. For example, the storage compartment 208 can be used to secure gas cans, tools, clothing, shelter, pelican cases (pelican cases are molded plastic containers that seal with an airtight and watertight gasket and include a barometric relief valve to prevent pressure damage to the case, during transportation or when the air pressure in the environment changes and if the case falls into water, generally there will be enough air in the case to keep it afloat), coolers, shovels, camera tripods, poles, packs or any other desired gear. The size of the storage compartment 208 (both height and length) can be adjusted by unscrewing (or otherwise detaching) one or more of the spacing and support rods 206 from the rack 102 and then screwing (or otherwise attaching) the removed spacing and support rods 206 at an alternate location on the rack 102.

FIG. 2 additionally shows that the rack 102 can include a grab bar 210. The grab bar 210 can be used to extract the snowmobile from snow or otherwise lift the rear of the snowmobile. In particular, because the rack 102 can be used to stiffen the tunnel, a user (or users) can lift up on the grab bar 210 which will lift the tunnel and, by extension, the snowmobile. For example, if the snowmobile has gotten stuck in a drift, the grab bar 210 can be used to lift the rear of the snowmobile, allowing the snowmobile to be maneuvered out of the drift. One of skill in the art will appreciate that the grab bar 210 can be a spacing and support rod 206 that is installed near the rear of the rack 102. Additionally or alternatively, the grab bar also serves as a tow mechanism, allowing the user to strap something to the bar and tow that element behind the snowmobile. This element can also be a skier, a sled, animal, or additional supplies loaded on a slideable object.

FIG. 2 moreover shows that the rack 102 can include a first set of attachment holes 212. The first set of attachment holes 212 can be configured to receive a strap or other attachment with a cross-section that is wider in one direction than another. I.e., the first set of attachment holes 212 can be approximately rectangular (that is, rectangular with rounded corners or with the short sides rounded). For example, the attachment holes 212 can be configured to receive voile straps. A voile strap includes a strap with a permanently attached buckle; the far end of the strap (i.e., the end not permanently attached to the buckle) passes through the buckle then is bent backward where a hole on the strap is placed on a spike in the buckle. A voile strap has the benefit of being quick to bind (i.e., secure within a loop) the desired objects and staying secure until released but can be released with a single motion.

FIG. 2 also shows that the rack 102 can include a second set of attachment holes 214. The second set of attachment holes 214 can be configured to receive an attachment with a hook, such as a bungee cord. A bungee cord, also known as a shock cord, is an elastic cord composed of one or more elastic strands forming a core, usually covered in a woven cotton or polypropylene sheath. Bungee cords are most often used to secure objects without tying knots and to absorb shock. Inexpensive bungee cords, with metal or plastic hooks on each end, are a general utility item. The hook can pass through the second set of attachment holes 214 for quick attachment to secure gear packs, poles, camera tripods, coolers or any other desired gear. Additionally or alternatively, the attachment holes 214 allow for the supporting rods 206 to be configured in more conducive manners for carrying certain gear in the rack or strapping gear on top of the rack 102.

FIG. 2 further shows that the rack 102 can include a first mounting zone 216a, second mounting zone 216b and third mounting zone 216c (collectively "mounting zones 216"). The mounting zones 216 can include an area of the rack 102 configured to allow other attachment mechanisms, straps, or devices to be mounted on the rack 102 on its interior and exterior. For example, the bracket 104 of FIG. 1 can be attached to the mounting zones 216. The mounting zones 216 can include curved or "jelly bean" shaped holes allowing the attached hardware to be rotated, achieving a desired angle. In particular, a first attachment point is a round hole and the second attachment point is a curved slot that is equidistant from the first attachment point. For example, the two attachment points can allow for a mounting angle of between 0 and 25 degrees relative to vertical (i.e., perpendicular to the base 204). Moreover, the first mounting zone 216a, second mounting zone 216b and third mounting zone 216c can allow for the attached devices to be spaced as desired by a user. For example, the spacing can be between 5 inches and 24 inches to allow for shorter and longer gear to be accommodated as desired by the user, also changing the degree of angle for that particular object being carried.

For example, a bracket mounted in the first mounting zone 216a and a bracket mounted in the third mounting zone 216c can be rotated which allows skis/snowboards/poles or other gear to sit flush in the bracket but held at an angle relative to the rack 102. Additionally or alternatively, the first mounting zone 216a, second mounting zone 216b and third mounting zone 216c can be offset relative to one another. I.e., the first mounting zone 216a, second mounting zone 216b and third mounting zone 216c can be at different heights on the sides 202 to create an inclined angle in the attached device. Offsetting one of the first mounting zone 216a, second mounting zone 216b and third mounting zone 216c can allow any mounted gear or devices to be stored at an angle between 0 and 30 degrees relative to horizontal.

FIG. 2 additionally shows that the rack 102 can include a snow scupper 218. The snow scupper 218 can allow a user to remove snow between the two opposing sides 202. I.e., as the snowmobile is used or otherwise exposed to snow, the snow scupper 218 can allow a user to easily remove snow by simply pushing the snow through the snow scupper 218. Additionally or alternatively, the snow scupper 218 can allow for additional attachment points.

Figure 3A:
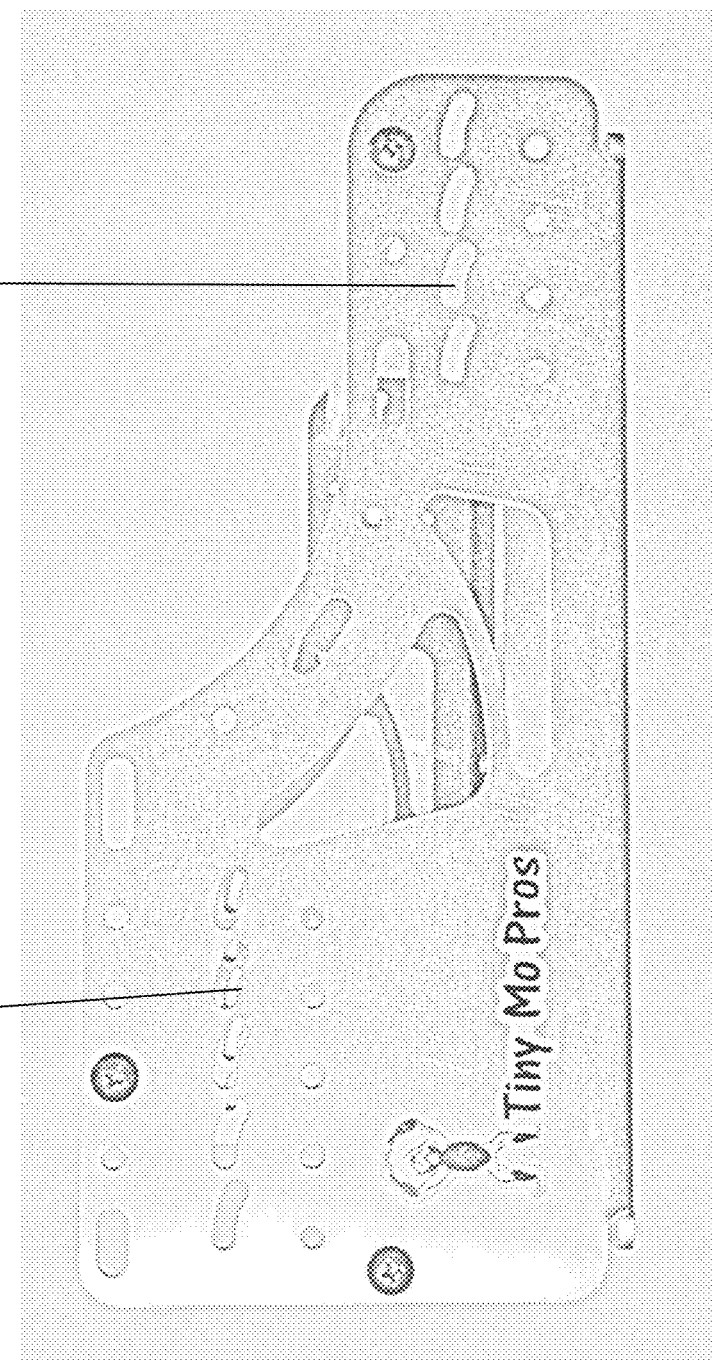
FIG. 3A illustrates a right side view of the alternative rack, with the left side view being a mirror image thereof.
Figure 3B:
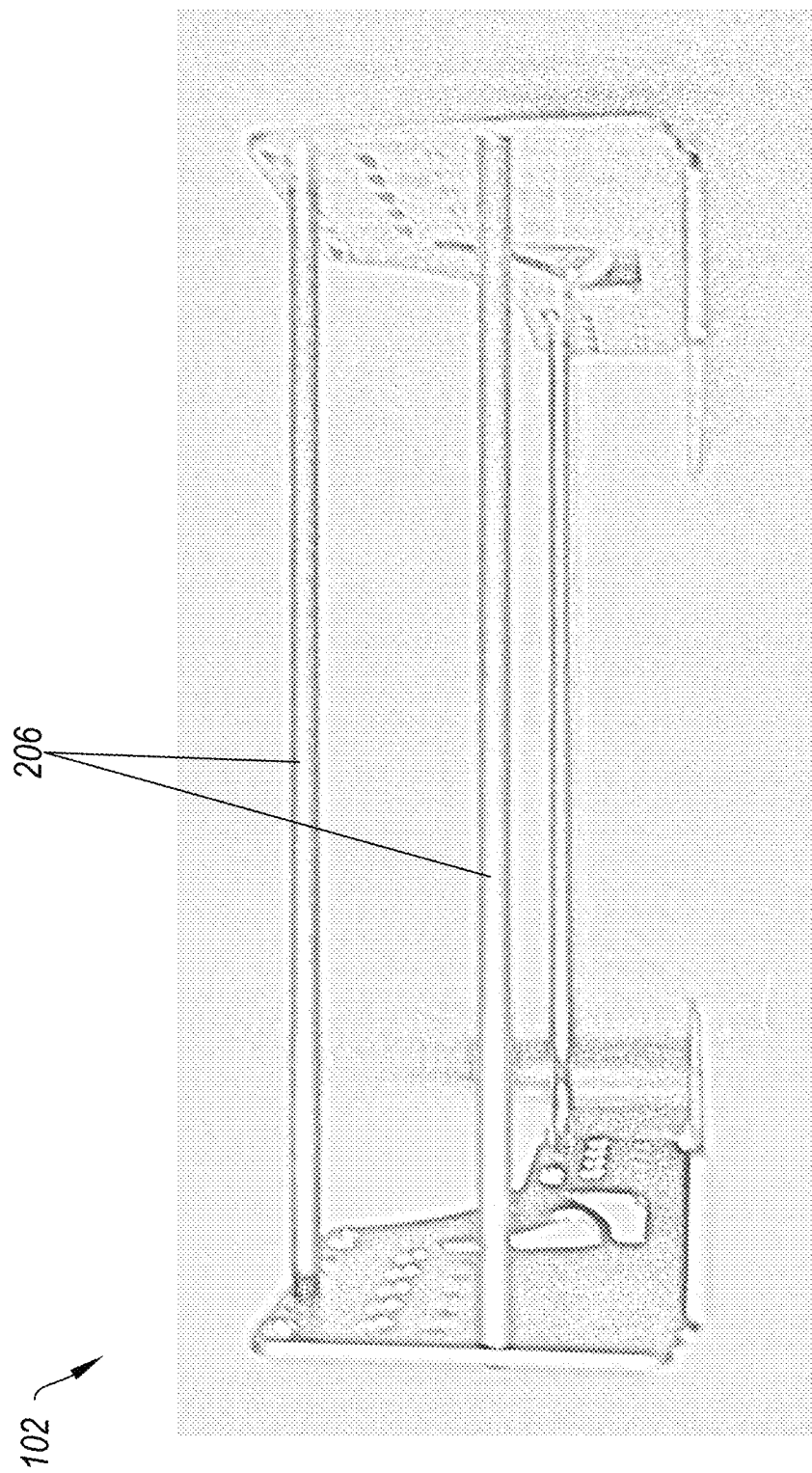
FIG. 3B illustrates a rear view of the alternative rack.
Figure 3C:
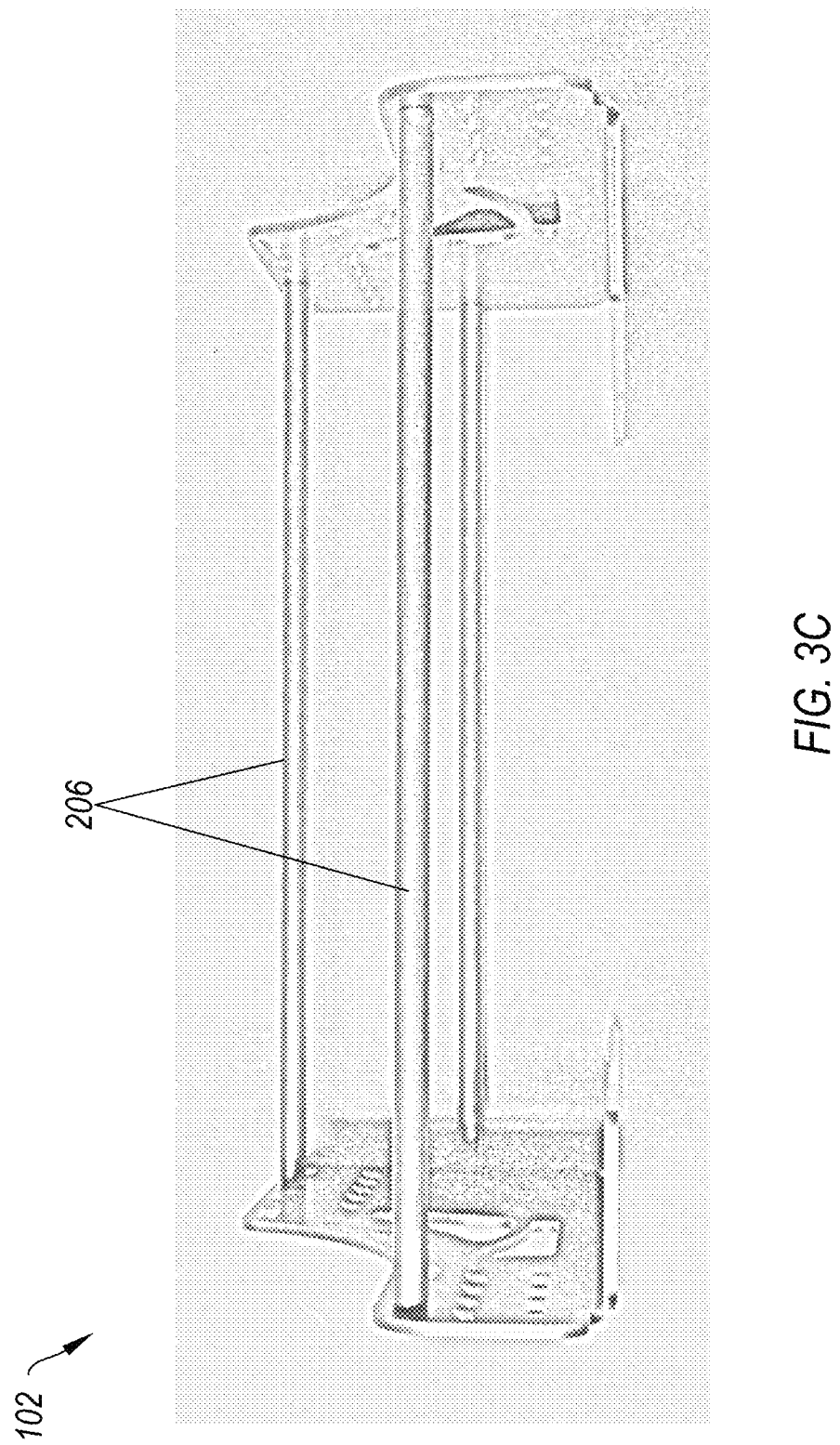
FIG. 3C illustrates a front view of the alternative rack.
Figure 3D:
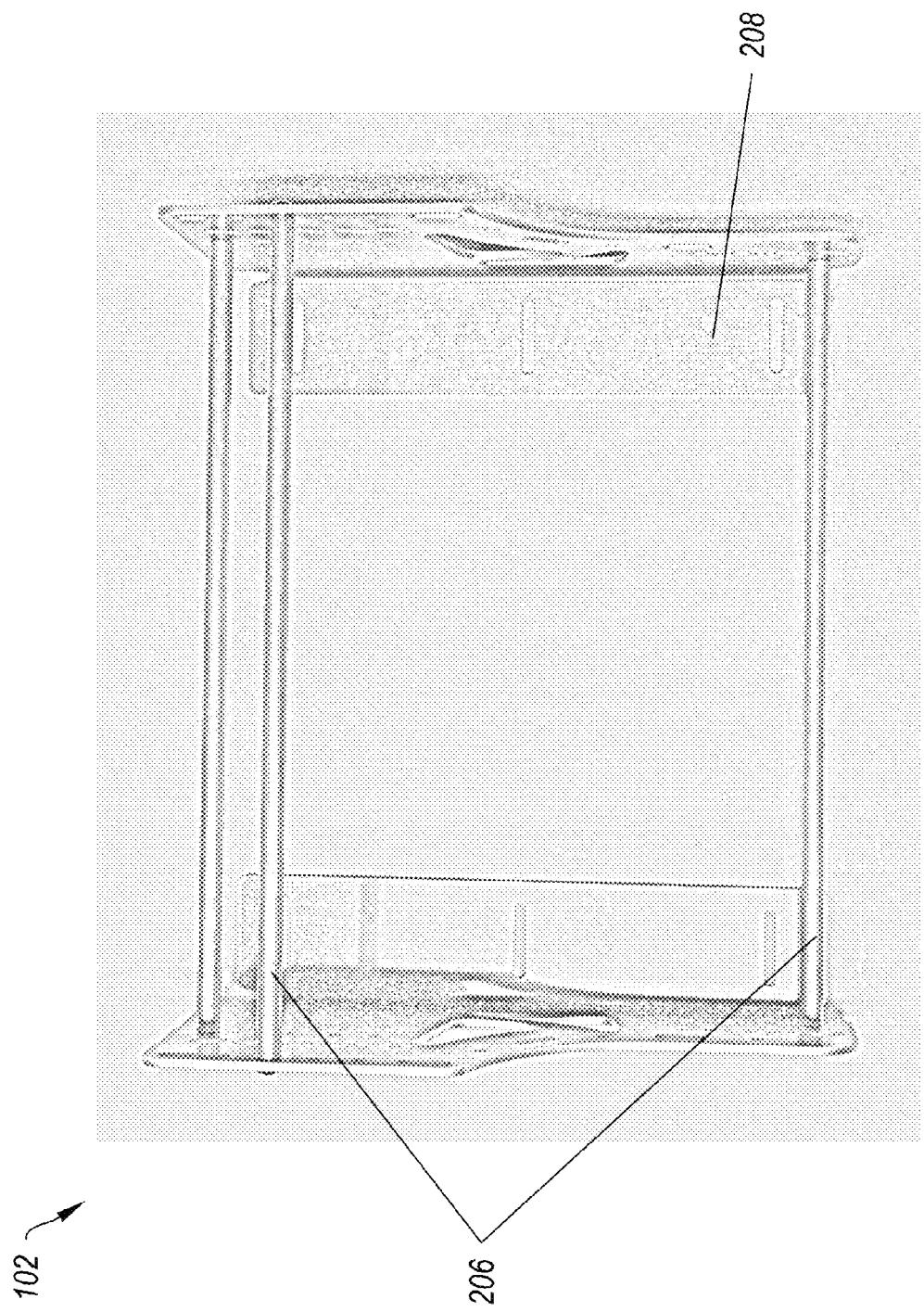
FIG. 3D illustrates a top view of the alternative rack.
Figure 3E:
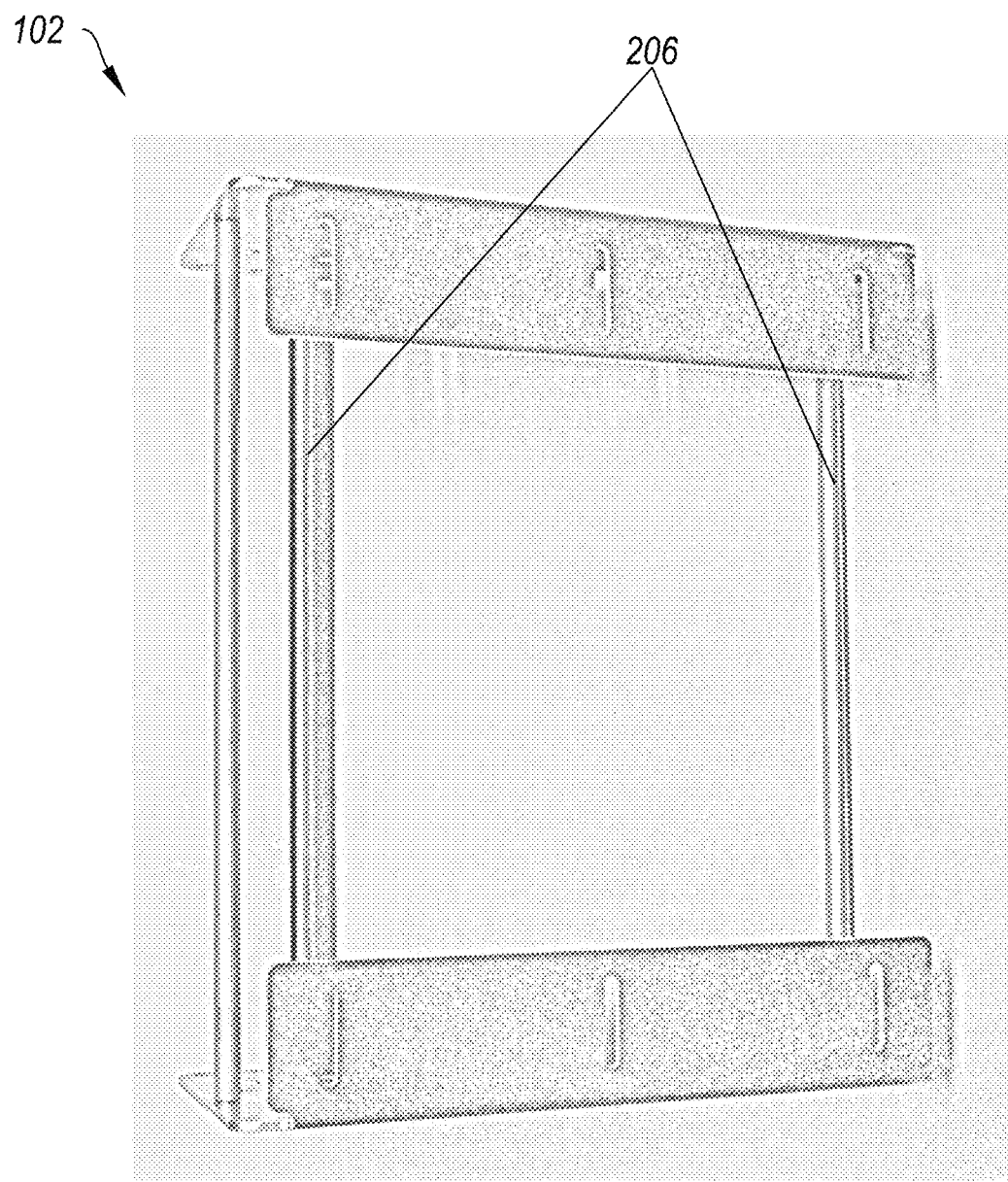
FIG. 3E illustrates a bottom view of the alternative rack.

FIGS. 3A, 3B, 3C, 3D and 3E (collectively "FIG. 3") illustrates an alternative example of a rack 102. FIG. 3A illustrates a right side view of the alternative rack 102, with the left side view being a mirror image thereof; FIG. 3B illustrates a rear view of the alternative rack 102; FIG. 3C illustrates a front view of the alternative rack 102; FIG. 3D illustrates a top view of the alternative rack 102; and FIG. 3E illustrates a bottom view of the alternative rack 102. The rack 102 is smaller than the rack 102 of FIG. 2. For example the smaller rack 102 can be lighter (approximately 3.6 pounds versus 6.3 pounds) and can include fewer spacing and support rods 206 (three instead of four) which leads to fewer and/or smaller storage compartments 208. Additionally, the smaller rack 102 can include two mounting zones 216 rather than three as in the larger rack and the mounting zones can allow less gear carrying angle (between 10 and 25 degrees rather than between 0 and 25 degrees) which allows for smaller distances between mounted devices (between 5 and 13 inches, rather than between 5 and 24 inches). As used in the specification and the claims, the term approximately shall mean that the value is within 10% of the stated value, unless otherwise specified.

Figure 4:
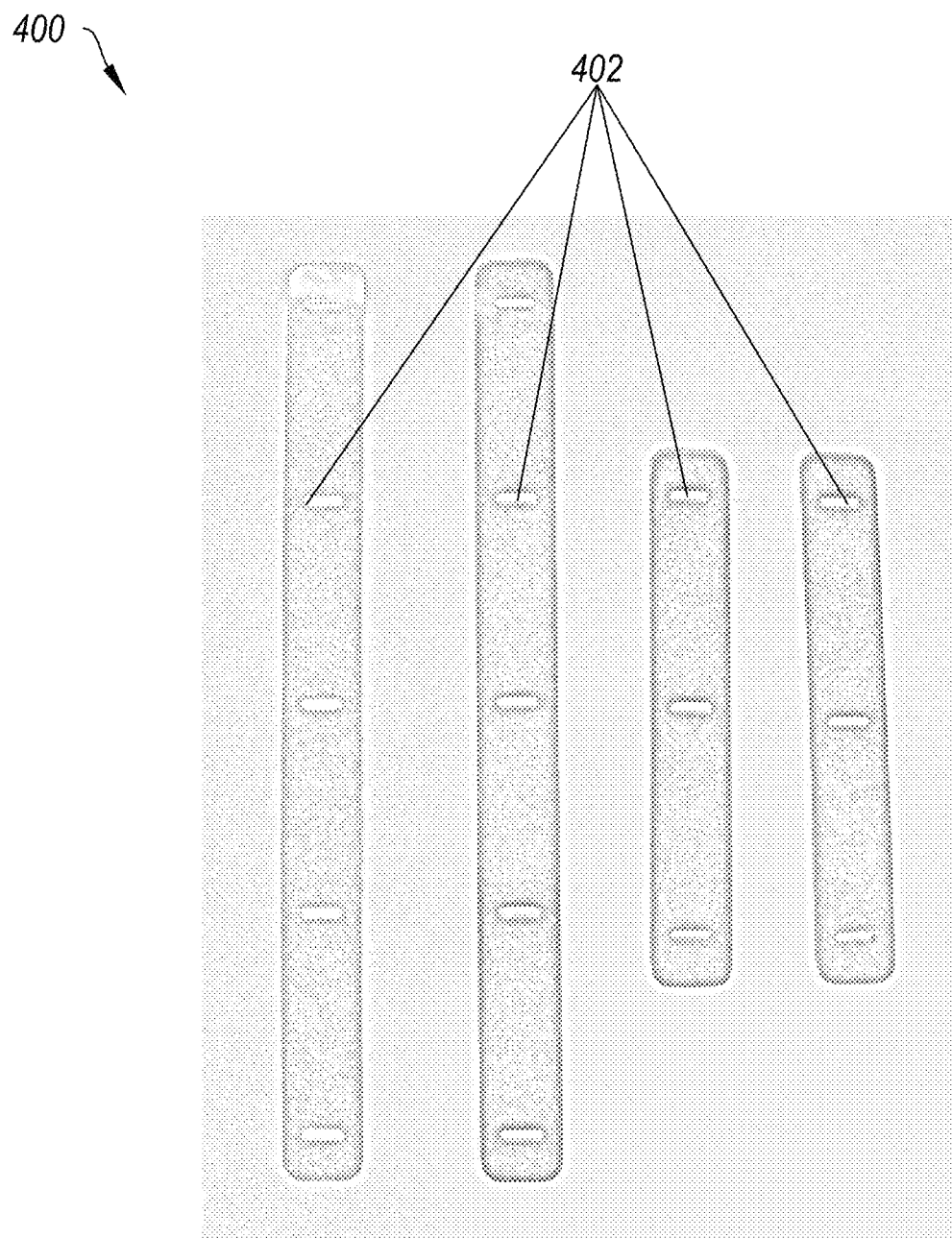
FIG. 4 illustrates an example of a tunnel mounting gusset.

FIG. 4 illustrates an example of a tunnel mounting gusset 400. A mounting gusset 400 includes a plate that allows for easy installation of a rack (such as the rack 102 of FIG. 1). In particular, the mounting gusset 400 can be placed on the tunnel of the snowmobile opposite the rack (i.e., the mounting gusset 400 and the rack "sandwich" the tunnel) to both stiffen the tunnel and to ensure secure attachment, even after extended use. In addition, the tunnel mounting gusset 400 prevents the mounting bolts from being torn out of the thin snowmobile tunnel when there is an accident (such as a crash or rollover) and preserves the tunnel integrity.

FIG. 4 shows that the mounting gusset 400 can include holes 402 or slots that allow the sled module to be connected directly to the snowmobile tunnel. For example, bolts or rivets can pass through holes in the rack and tunnel and through the holes in the mounting gusset 400, securing the mounting gusset 400 to the rack and tunnel. Thus the sled module can be integrated into any sled platform.

Figure 5A:
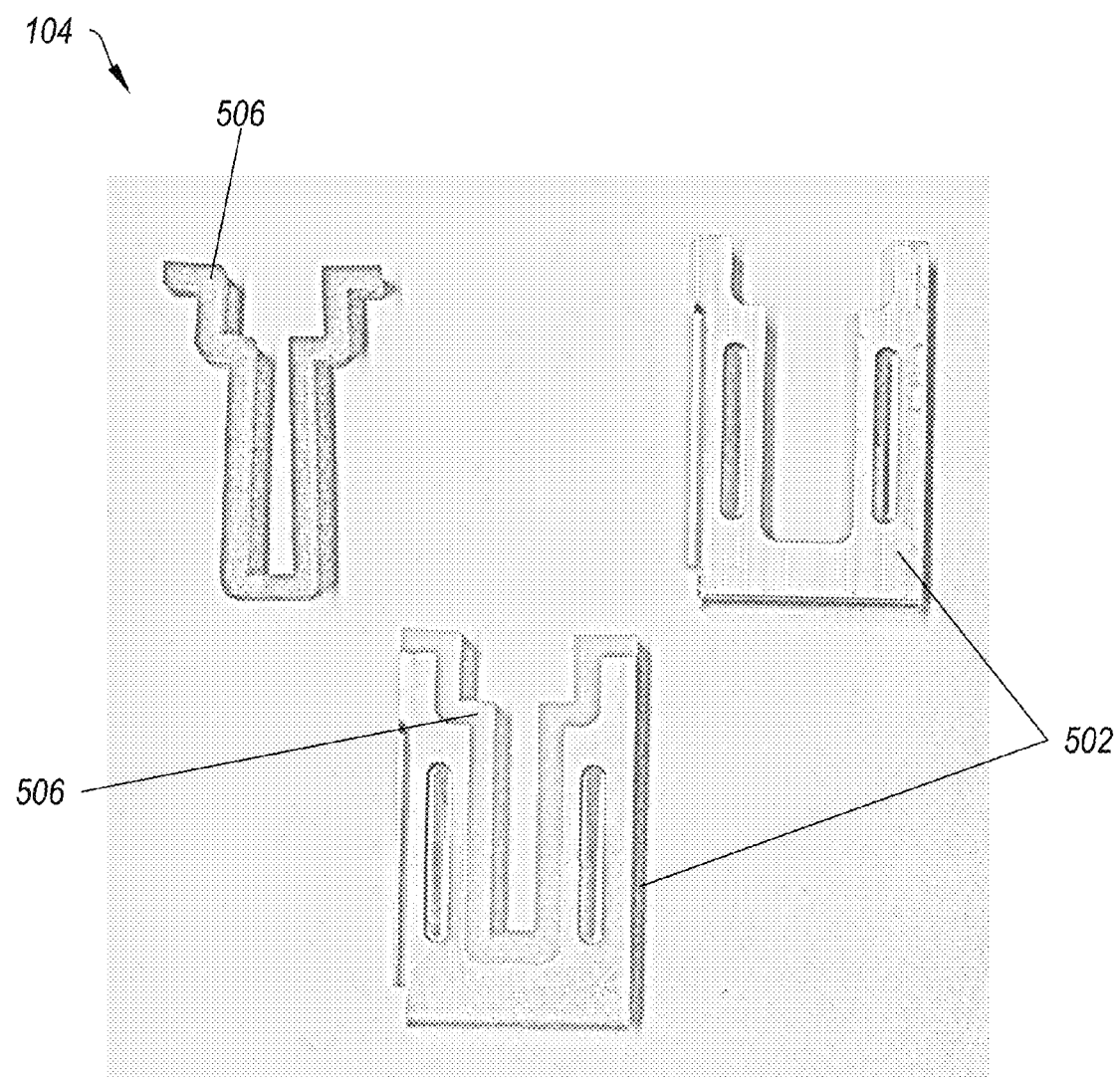
FIG. 5A illustrates a front view of the bracket, with the rear view being a mirror image thereof.
Figure 5B:
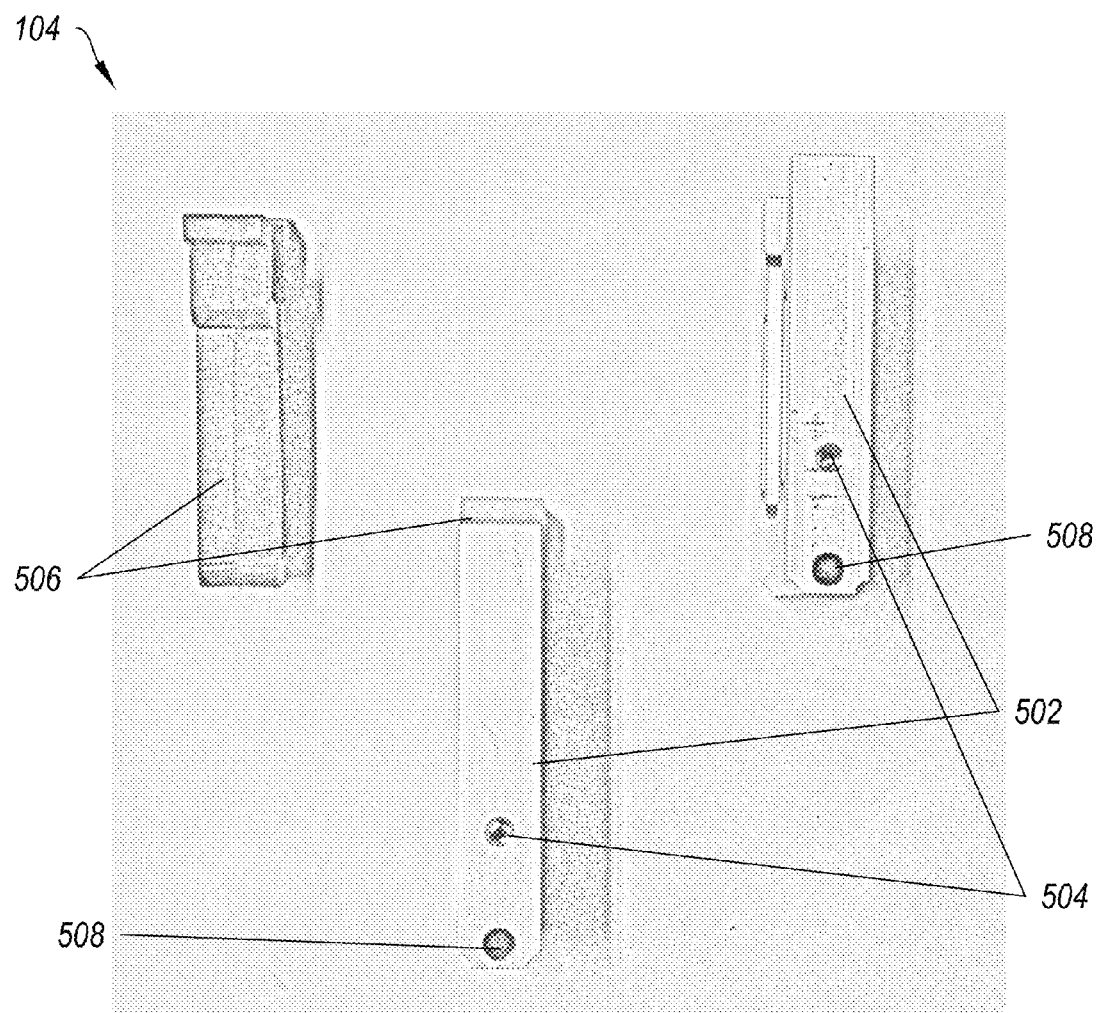
FIG. 5B illustrates a right side view of the bracket.
Figure 5C:
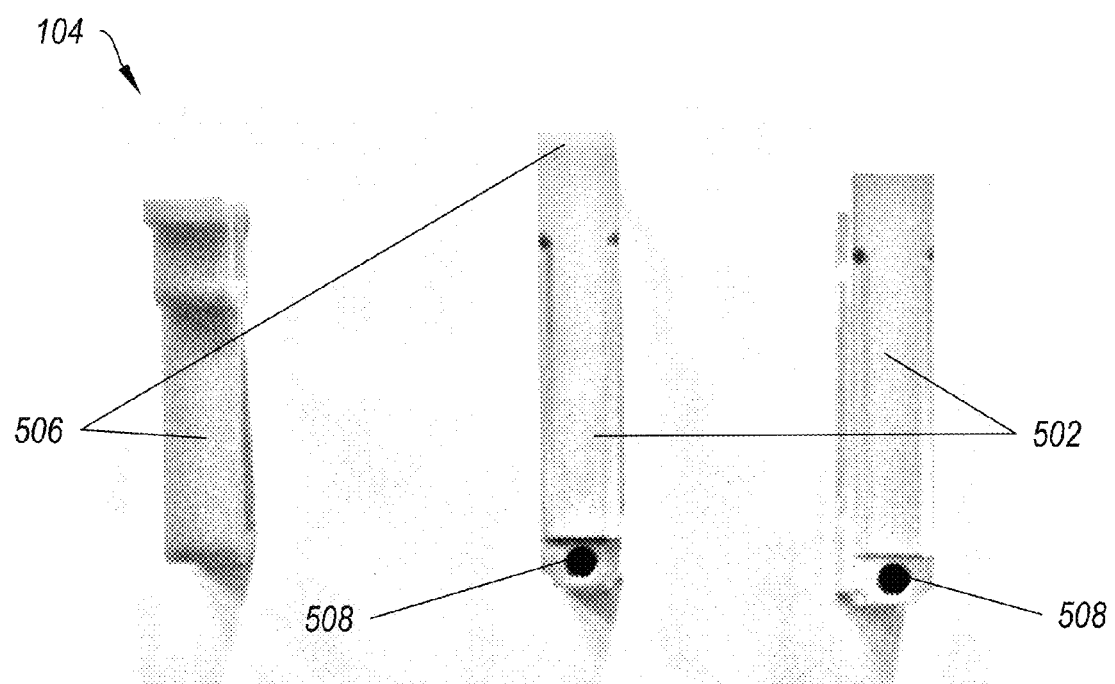
FIG. 5C illustrates a left side view of the bracket.
Figure 5D:
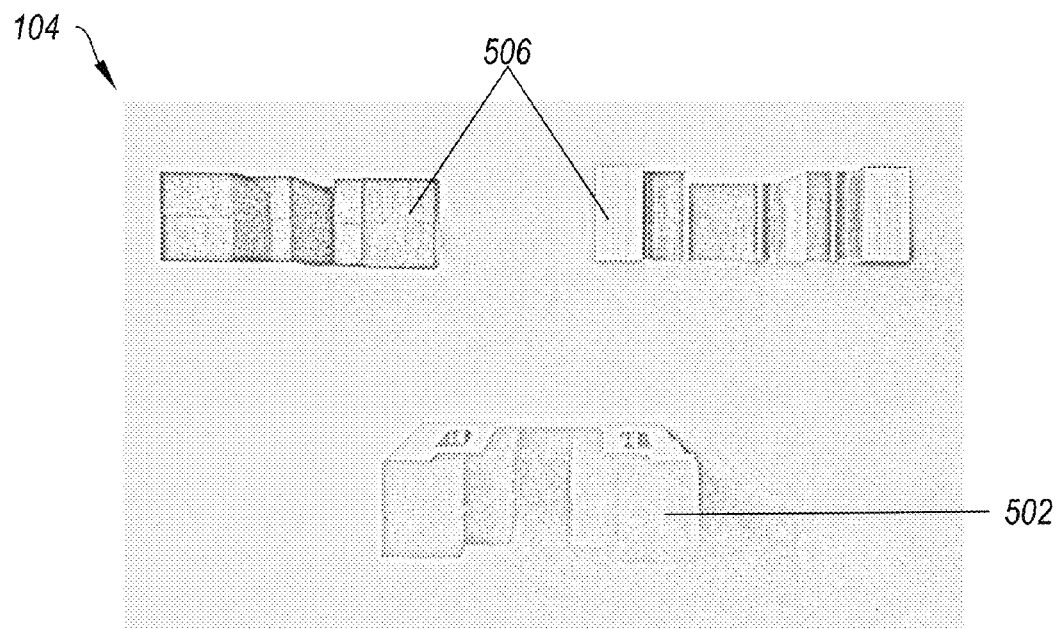
FIG. 5D illustrates a top view of the bracket.
Figure 5E:
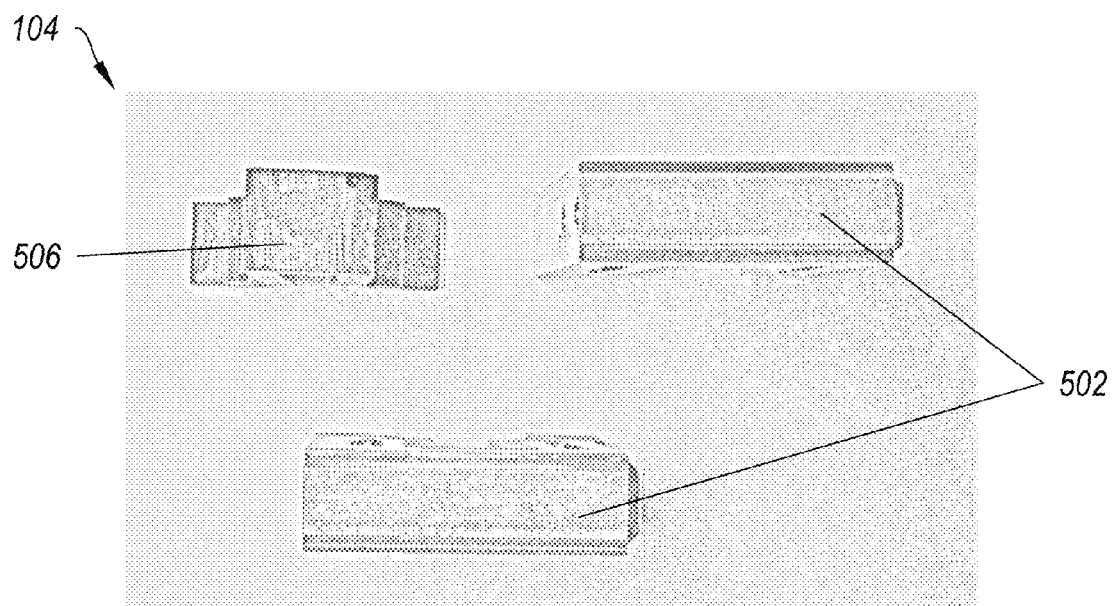
FIG. 5E illustrates a bottom view of the bracket.

FIGS. 5A, 5B, 5C, 5D and 5E (collectively "FIG. 5") illustrate an example of a bracket 104. FIG. 5A illustrates a front view of the bracket 104, with the rear view being a mirror image thereof; FIG. 5B illustrates a right side view of the bracket 104; FIG. 5C illustrates a left side view of the bracket 104; FIG. 5D illustrates a top view of the bracket 104; and FIG. 5E illustrates a bottom view of the bracket 104. The bracket 104 can be attached to a rack or any other flat surface to secure desired items. I.e., it mounts to the outside of the rack, increasing the mounting capacity of the rack. The bracket 104 is specifically configured to receive skis, poles, and snowboards but this is not intended to limit the scope and the bracket 104 can be used for securing other gear as desired, such as a tripod or tent.

FIG. 5 shows that the bracket 104 can include a first layer 502. The first layer 502 is configured to be strong enough to allow the bracket 104 to be attached to an external mounting point. For example, the first layer 502 can include materials such as steel, aluminum or hard plastics that have a high strength to weight ratio such that when the bracket 104 is secured to a rack, for example, the attachment can be made very secure and resist bouncing and other shocks from snowmobile use.

FIG. 5 also shows that the first layer 502 can include an attachment 504. The attachment 504 can include any mechanism for securing the first layer 502 to the external mounting point. For example, the attachment 504 can include a threaded hole, allowing the bracket 104 to receive a threaded screw or bolt. Additionally or alternatively, the attachment 504 can include a stud that can pass through an opening and then moved within a slot.

FIG. 5 further shows that the bracket 104 can include a second layer 506. The second layer 506 can be shaped to receive skis, poles, and/or snowboards but this is not intended to limit the scope and the bracket 104 can be used for securing other gear as desired, such as a tripod or tent. For example, the second layer 506 can include a lower notch and upper notch. The lower notch is configured to hold the "body" of the ski, poles, or snowboard. In contrast, the upper notch, which is wider than the lower notch makes room for the ski binding.

The second layer 506 can be attached to the first layer 502. For example, the second layer 506 can be attached using glue (adhesives), mechanical fasteners, or another bonding agent. Thus, the second layer 506 can be detached and replaced when needed. Additionally or alternatively, the second layer 506 can be configured to include materials that are softer so as to avoid damaging the skis/poles/snowboards placed in the bracket 104. For example, the second layer 506 can include soft plastics, nylon composites, or urethanes which have some elasticity to avoid scratching the skis/snowboards.

FIG. 5 additionally illustrates that the bracket 104 can include a strap attachment 508. The strap attachment 508 can be configured to allow a strap to be attached to the bracket, securing the skis/snowboard. For example, the strap attachment 508 can include a post to which the strap can be attached. Additionally or alternatively, the strap attachment 508 can include a threaded hole to which a portion of the strap can be screwed or bolted.

Figure 6A:
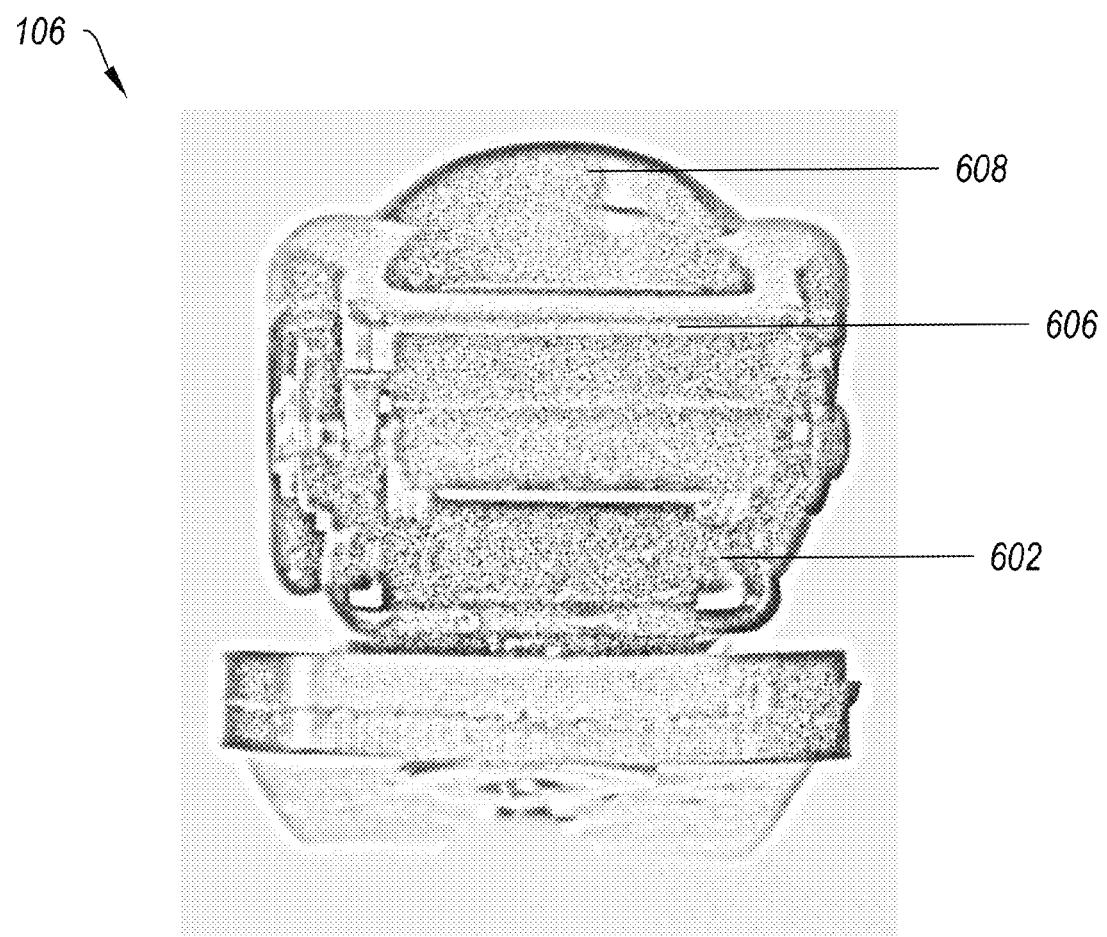
FIG. 6A illustrates a front view of the strap, with the rear view being a mirror image thereof.
Figure 6B:
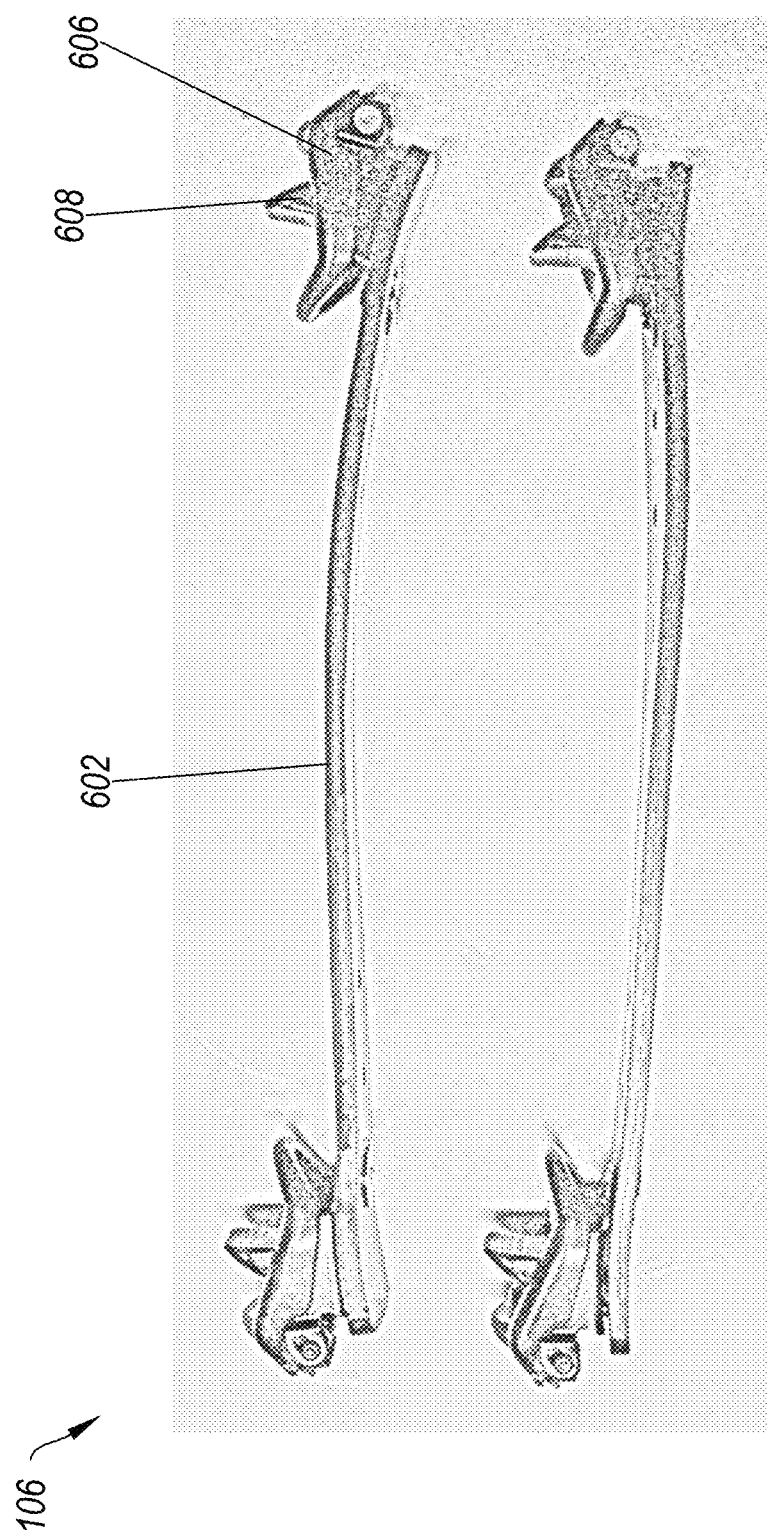
FIG. 6B illustrates a right side view of the strap, with the left side view being a mirror image thereof.
Figure 6C:
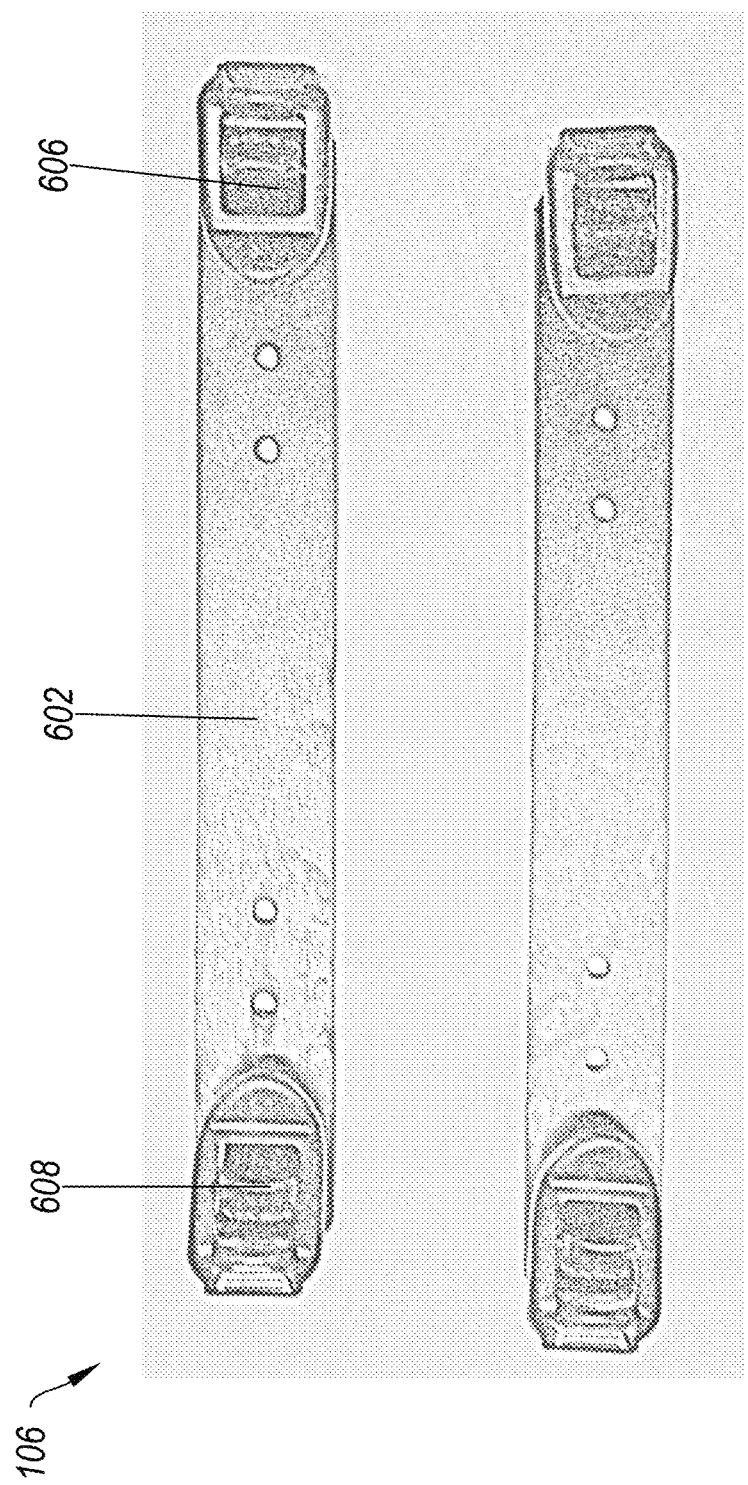
FIG. 6C illustrates a top view of the strap.
Figure 6D:
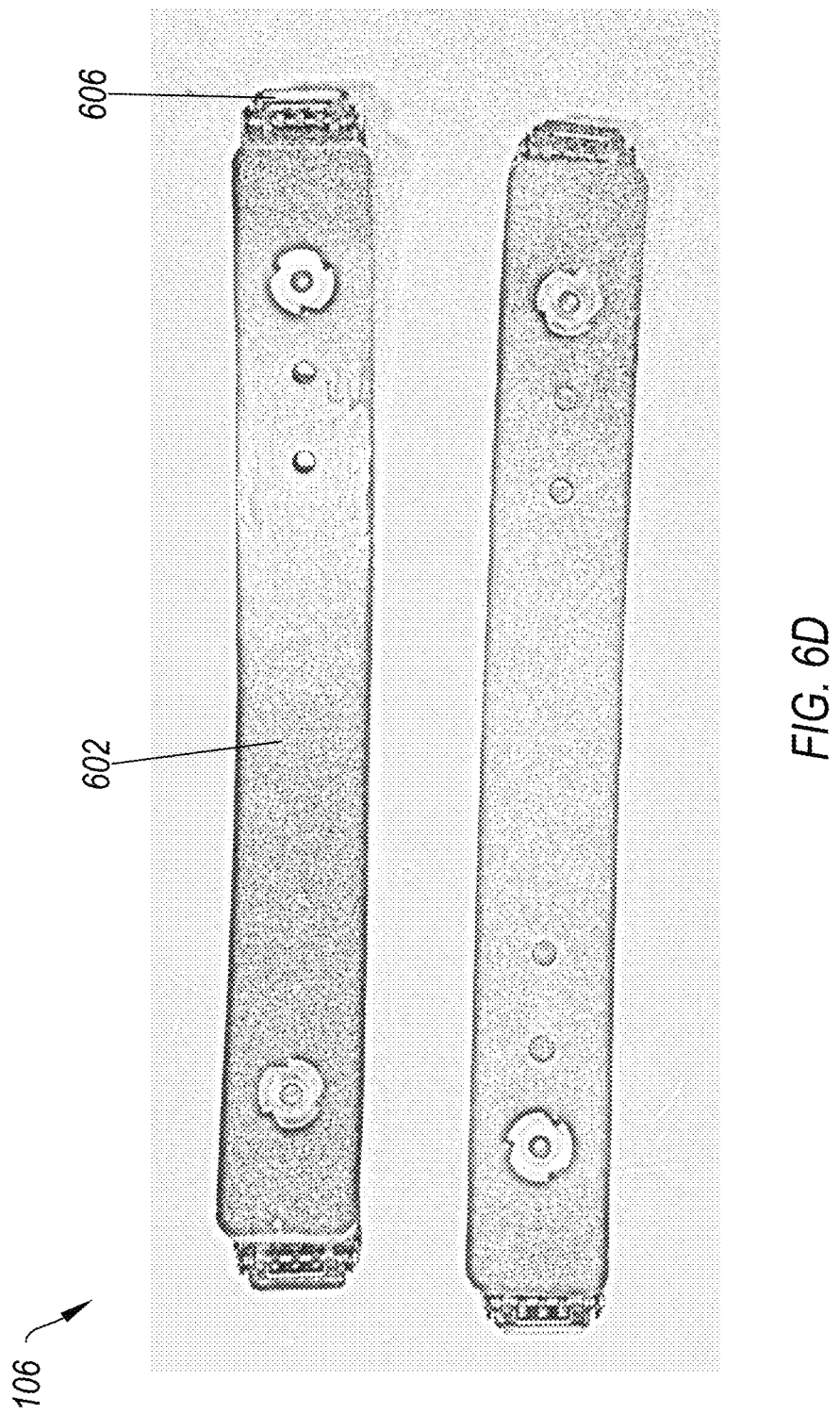
FIG. 6D illustrates a bottom view of the strap.
Figure 6E:
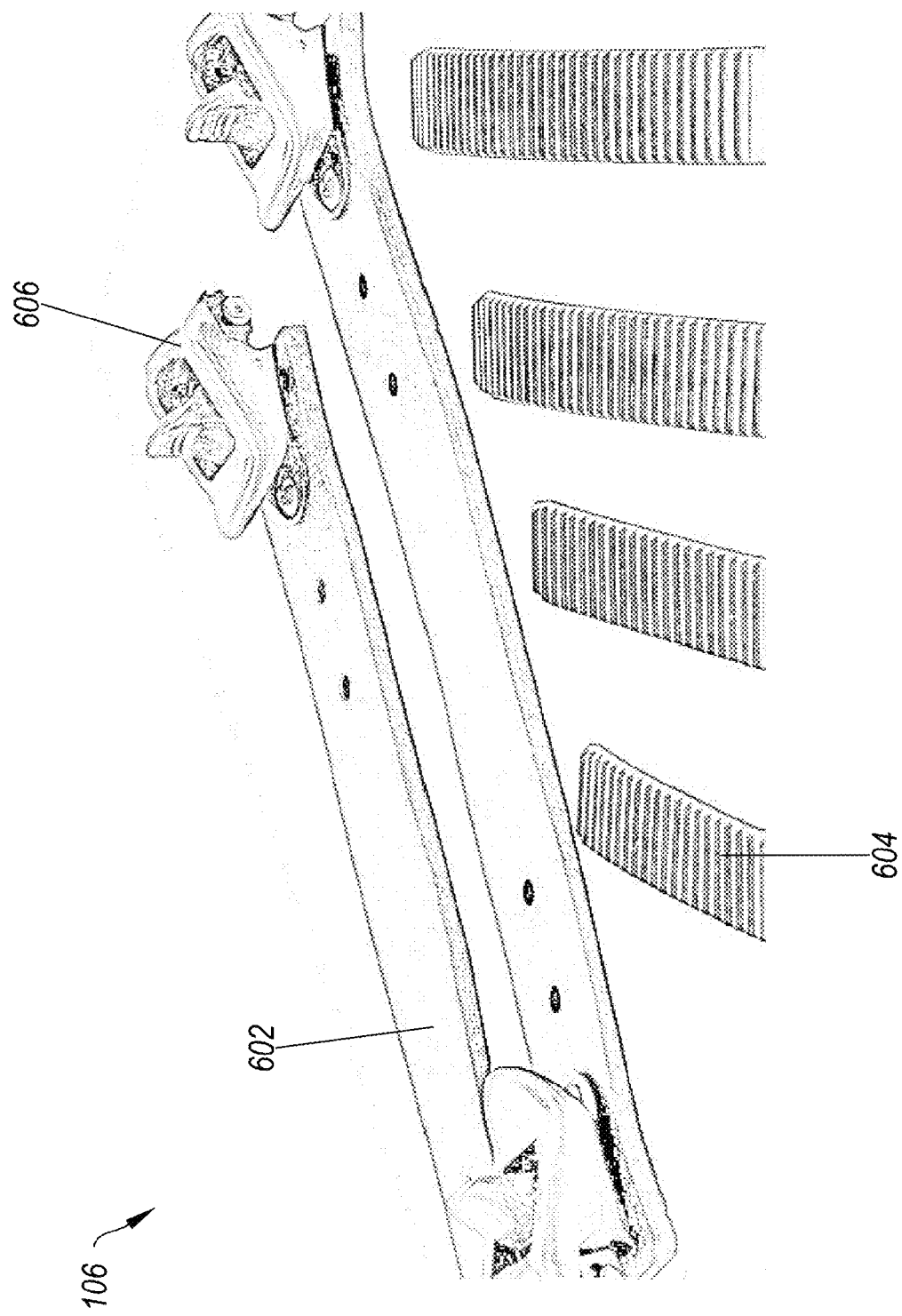
FIG. 6E illustrates a perspective view of the strap.

FIGS. 6A, 6B, 6C, 6D and 6E (collectively "FIG. 6") illustrate an example of a strap 106. FIG. 6A illustrates a front view of the strap 106, with the rear view being a mirror image thereof; FIG. 6B illustrates a right side view of the strap 106, with the left side view being a mirror image thereof; FIG. 6C illustrates a top view of the strap 106; FIG. 6D illustrates a bottom view of the strap 106; and FIG. 6E illustrates a perspective view of the strap 106. The strap 106 is configured to secure the ski/poles/snowboard (or other gear as desired) in the bracket, such as the bracket 104 of FIG. 1. I.e., the strap 106 can be secured holding an external device in a desired position.

FIG. 6 shows that the strap 106 can include a first section 602. The first section 602 includes a stretchable section. I.e., the first section 602 can include an elastic material which is configured to lengthen under a force and then attempt to return to its original length when the force has been removed. Additionally or alternatively, the first section 602 can include one or more adjustments. For example, the first section 602 can include holes which allow for the total length of the strap to be adjusted, as described below.

FIG. 6 also shows that the strap 106 can include two second sections 604. The second section 604 is configured to be attached to an external device, such as the bracket 104 of FIG. 1. For example, the second section can be screwed or bolted to the external device. The second section 604 can include ridges that can be used to retain the second section 604 with respect to the first section 602, as described below.

FIG. 6 further shows that the strap 106 can include ratchets 606 attached to the first section 602 attached on either end of the first section. Ratchets 606 on either end of the strap 106 can provide greater adjustability of the strap 106. I.e., a second ratchet is critical in providing flexibility in the configuration of the strap 106, allowing a user to more precisely adjust the strap 106 to meet his/her needs. The ratchet 606 is a mechanical device that allows continuous linear or rotary motion in only one direction while preventing motion in the opposite direction unless released. The ratchet 606 consists of a pivoting, spring-loaded finger called a pawl that engages the ridges of the second section 604. The ridges are uniform but asymmetrical, with each ridge having a moderate slope on one edge and a much steeper slope on the other edge. When the ridges are moving in the unrestricted (i.e., forward) direction the pawl easily slides up and over the gently sloped edges of the ridges, with a spring forcing it (with an audible 'click') into the depression between the ridges as it passes the tip of each ridge. When the ridges move in the opposite (backward) direction, however, the pawl will catch against the steeply sloped edge of the first ridge it encounters, thereby locking it against the ridge and preventing any further motion in that direction. Additionally or alternatively, a smooth, ridgeless second section 604 with a high friction surface such as rubber may be used. The pawl bears against the surface at an angle so that any backward motion will cause the pawl to jam against the surface and thus prevent any further backward motion.

FIG. 6 additionally shows that the ratchet 606 can include a release 608. The release 608 is configured to lift the pawl such that the pawl is no longer in contact with the second section 604. Thus, the second section 604 can then be moved freely relative to the first section 602 and the ratchet 602. I.e., pressing the release 608 can allow a user to remove the strap 106 and any items held by the strap 106.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sled module, the sled module comprising:
   a rack configured to attach to a tunnel of a snowmobile, wherein the rack includes:
     two opposing sides, each of the two opposing sides comprising:
       a base on each of the two opposing sides;
       a forward mounting zone and a rearward mounting zone, each of the forward mounting zone and the rearward mounting zone comprising a row of mounting hole pairs, each mounting hole pair comprising:
         a first curved slotted mounting hole and
         a second mounting hole;
       wherein the first mounting hole and the second mounting hole are placed one above another and the row of mounting hole pairs of the rearward mounting zone is higher relative to the base than the row of mounting hole pairs of the forward mounting zone; and
     at least two spacing and support rods configured to attach the opposing sides to one another;
     a bracket configured to receive an external device.

2. The sled module of claim 1, wherein the two opposing sides and the at least two spacing and support rods form a storage compartment.

3. The sled module of claim 1, further comprising a mounting gusset configured to mate with one of the bases.

4. A sled module, the sled module comprising:
   a rack configured to attach to a tunnel of a snowmobile, wherein the rack includes:
     two opposing sides;
     a base on each of the two opposing sides;
     at least two spacing and support rods configured to attach the opposing sides to one another;
     a grab bar attached to the two opposing sides configured to allow a user to lift at least a portion of the snowmobile using the grab bar;
     a first set of attachment holes, wherein each of the holes in the first set of attachment holes is configured to receive an external strap; and
     a forward set of attachment hole pairs, wherein each of the hole pairs in the set of attachment hole pairs comprises a first curved slotted mounting hole and a second mounting hole placed one above another;
     a rearward set of attachment hole pairs, wherein each of the hole pairs in the set of attachment hole pairs comprises a first curved slotted mounting hole and a second mounting hole placed one above another, wherein the rearward set of attachment hole pairs is higher than the forward set of attachment hole pairs relative to the base;
     a mounting gusset:
       configured to mate with one of the bases; and
       including one or more holes; and
     a bracket, wherein the bracket includes:
       a first layer configured to attach to the rack; and
       a second layer attached to the first layer.

5. The sled module of claim 4, wherein the external strap includes a voile strap.

6. The sled module of claim 4, wherein the circular attachment includes at least one of:
   a bungee cord; and
   a rope.

7. The sled module of claim 4, wherein the second layer includes a notch configured to receive an external device.

8. The sled module of claim 7, wherein the second layer includes a second notch, wherein the second notch is wider than the notch.

9. The sled module of claim 4 further comprising at least one of:
   an adhesive attaching the second layer to the first layer; and
   a mechanical attachment attaching the second layer to the first layer.

10. The sled module of claim 4 attached to a snowmobile tunnel.

11. The sled module of claim 4, wherein the second layer includes a soft material.

12. The sled module of claim 11, wherein the second layer includes urethane.

13. The sled module of claim 4, wherein the first layer includes a hard material.

14. The sled module of claim 13, wherein the first layer includes aluminum.

15. A sled module, the sled module comprising:
   a rack configured to attach to a tunnel of a snowmobile, wherein the rack includes:
     two opposing sides;
     a base on each of the two opposing sides;
     at least two spacing and support rods configured to attach the opposing sides to one another;
     a grab bar attached to the two opposing sides configured to allow a user to lift at least a portion of the snowmobile using the grab bar;
     a first set of attachment holes, wherein each of the holes in the first set of attachment holes is configured to receive an external strap;
     a set of attachment hole pairs, wherein each of the hole pairs in the set of attachment hole pairs comprises a first curved slotted mounting hole and a second mounting hole placed one above another; and
     a first mounting zone comprising a forward subset of the attachment hole pairs and a second mounting zone comprising a rearward subset of the attachment hole pairs, each of the first mounting zone and the second mounting zone configured to allow an external device to be attached to the rack at the attachment hole pairs;

a mounting gusset:
  configured to mate with one of the bases; and
  including one or more holes;

at least one bracket including:
  a forward carrying surface having a first vertical offset from the base;
  a rearward carrying surface having a second vertical offset from the base, wherein the second vertical offset is greater than the first vertical offset;
  a first layer configured to attach to the rack at the first mounting zone;
  a second layer attached to the first layer; and
  a strap attachment; and a strap, wherein the strap includes:
  a first section;
  a first ratchet on a first end of the first section;
  a second ratchet on a second end of the first section, wherein the second end is opposite the first end; and
  at least two second sections, wherein the at least two second sections are configured to mate with the first and second ratchet.

16. The sled module of claim 15, wherein the first mounting zone is configured to allow a mounting angle of the attached device between 0 degrees and 25 degrees relative to vertical from one of the bases.

17. The sled module of claim 16, wherein the second mounting zone is configured to allow a mounting angle of the attached device between 0 degrees and 25 degrees relative to vertical from one of the bases.

18. The sled module of claim 15, wherein one of the at least two second sections includes a series of ridges.

19. The sled module of claim 15 further comprising a third mounting zone.

20. The sled module of claim 15, wherein the second mounting zone is offset relative to the first mounting zone to allow gear to be carried at an angle of between 0 and 30 degrees relative to horizontal.

* * * * *